(12) United States Patent
Lawniczek et al.

(10) Patent No.: US 12,286,904 B2
(45) Date of Patent: Apr. 29, 2025

(54) BLADE AND SLOTTED ROTOR WHEEL FOR A GAS TURBINE ENGINE

(71) Applicant: SAFRAN AIRCRAFT ENGINES, Paris (FR)

(72) Inventors: Baptiste Dorian Lawniczek, Moissy-Cramayel (FR); Didier René André Escure, Moissy-Cramayel (FR); Clémentine Charlotte Marie Mouton, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/541,042

(22) Filed: Dec. 15, 2023

(65) Prior Publication Data
US 2024/0209743 A1     Jun. 27, 2024

(30) Foreign Application Priority Data

Dec. 16, 2022    (FR) ...................................... 2213620
Dec. 13, 2023    (FR) ...................................... 2314108

(51) Int. Cl.
    F01D 5/30       (2006.01)
    B64C 11/04      (2006.01)
    (Continued)

(52) U.S. Cl.
    CPC ............ F01D 5/3007 (2013.01); B64C 11/04 (2013.01); B64C 11/20 (2013.01); F01D 15/00 (2013.01)

(58) Field of Classification Search
CPC . F01D 5/3007; F01D 5/02; F01D 5/12; F01D 5/14; F01D 5/141; F01D 5/143;
(Continued)

(56) References Cited

U.S. PATENT DOCUMENTS

2011/0217175 A1\*   9/2011   Tochitani ............. F01D 5/3007
                                                      416/193 A
2013/0192266 A1\*   8/2013   Houston ................... F02C 7/36
                                                        60/805

(Continued)

FOREIGN PATENT DOCUMENTS

EP            3032032 A1 \*   6/2016   ............. F01D 25/30
EP          3 511 522 A1     7/2019
(Continued)

OTHER PUBLICATIONS

Petko et al., Characterization of C/SiC Ceramic Matrix Composites (CMCs) with Novel interface Fiber Coatings NASA, 2002, p. 3 (Year: 2002).\*

(Continued)

*Primary Examiner* — Courtney D Heinle
*Assistant Examiner* — Ryan C Clark
(74) *Attorney, Agent, or Firm* — Sughrue Mion, PLLC

(57) ABSTRACT

A blade includes a root to be mounted in a slot of plural slots which open out at an outer periphery of a rotor disk of a movable wheel of a low-pressure turbine of an aeronautical propulsion system, the rotor disk being centered on a longitudinal axis and the slots being circumferentially distributed about the longitudinal axis, the rotor disk having an upstream surface and a downstream surface, each slot being delimited by a bottom surface, the rotor disk including blades circumferentially distributed at the outer periphery of the rotor disk, each blade being mounted in a corresponding slot, the root including a first platform which has a radially outer surface; a shroud having a second platform which has a radially inner surface; and an airfoil extending from the root to the shroud, the airfoil having a leading edge and a trailing edge.

22 Claims, 13 Drawing Sheets

Figure 1:
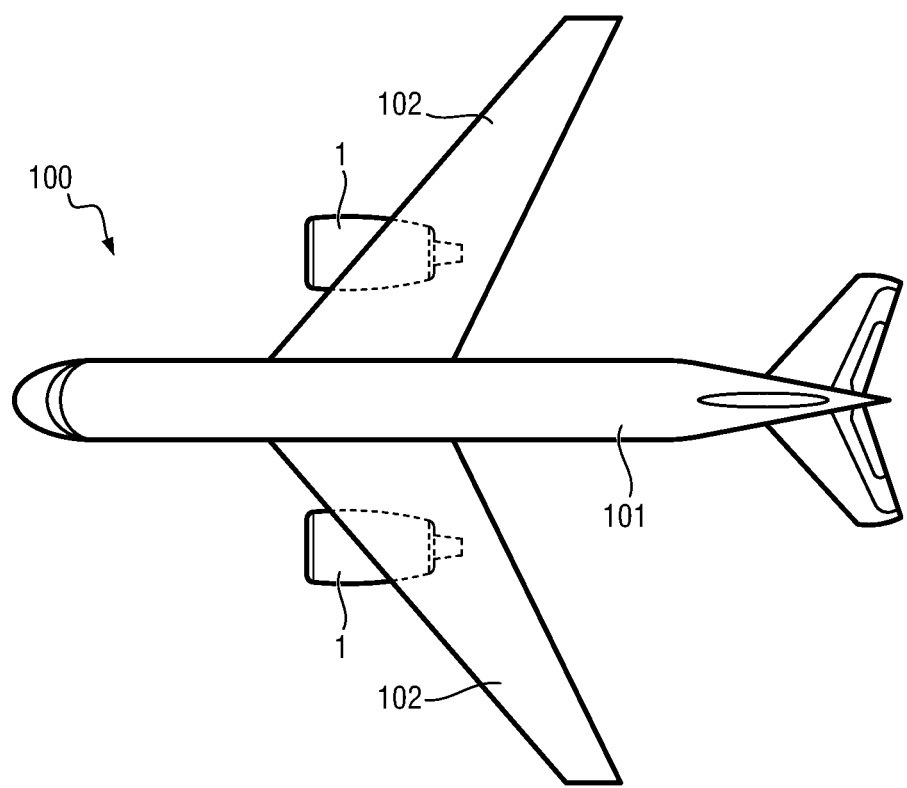

(51) Int. Cl.
*B64C 11/20* (2006.01)
*F01D 15/00* (2006.01)

(58) Field of Classification Search
CPC ......... F01D 5/225; F01D 15/00; B64C 11/04; B64C 11/20; F05D 2240/301; F05D 2240/303; F05D 2240/304; F05D 2240/305; F05D 2240/306; F05D 2240/307; F05D 2300/00
See application file for complete search history.

(56) References Cited

U.S. PATENT DOCUMENTS

| | | | | |
|---|---|---|---|---|
| 2019/0085700 | A1* | 3/2019 | Pernleitner | F01D 5/225 |
| 2020/0248711 | A1* | 8/2020 | Shaughnessy | F04D 29/329 |
| 2020/0270995 | A1* | 8/2020 | Maar | F01D 5/28 |
| 2020/0271002 | A1* | 8/2020 | Maar | F01D 5/225 |
| 2021/0301731 | A1* | 9/2021 | Adams | F01D 5/06 |

FOREIGN PATENT DOCUMENTS

| | | | | |
|---|---|---|---|---|
| EP | 3708819 | A1 * | 9/2020 | F01D 5/043 |
| EP | 3885553 | A1 * | 9/2021 | F02C 3/107 |
| EP | 4 026 986 | A2 | 7/2022 | |
| WO | 2021/013281 | A1 | 1/2021 | |

OTHER PUBLICATIONS

Linde Gas and Equipment Inc. https://www.lindedirect.com/resources/technical-information/physical-properties-of-gases (Year: 2024).*
Inconel Alloy 625 datasheet https://asm.matweb.com/search/SpecificMaterial.asp?bassnum=NINC33 (Year: 2024).*
French Search Report for FR 2213620 dated Jul. 5, 2023.

* cited by examiner

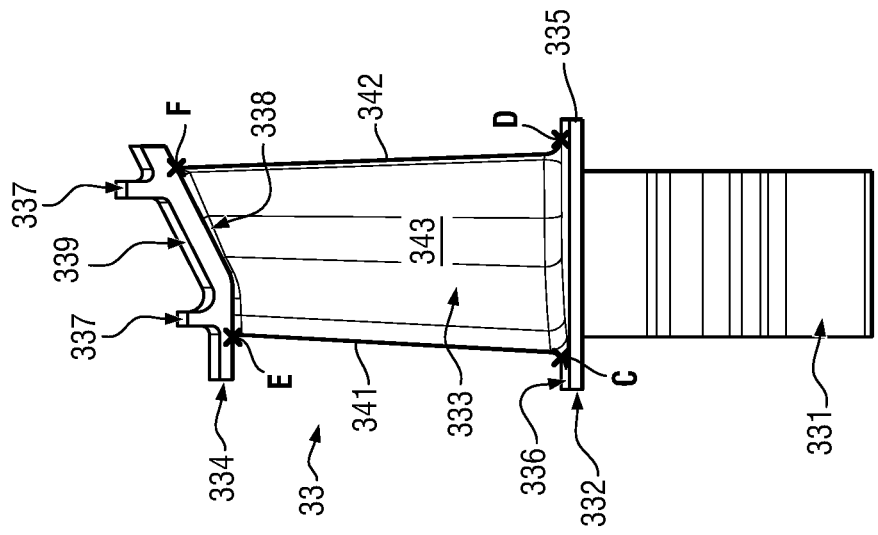
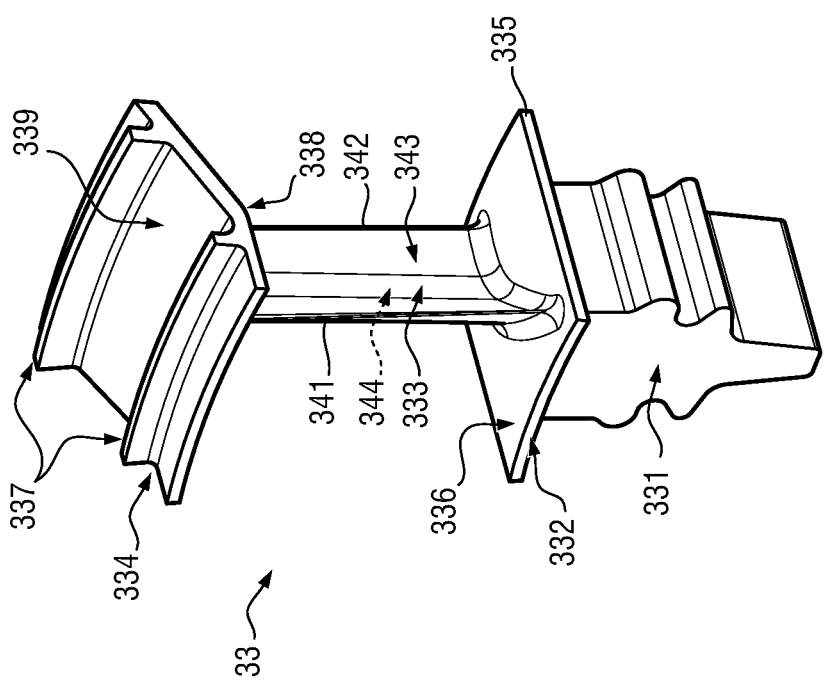

BLADE AND SLOTTED ROTOR WHEEL FOR A GAS TURBINE ENGINE

FIELD OF THE INVENTION

The invention relates to a turbine blade for a movable wheel of a low-pressure turbine of an aeronautical propulsion system, a movable turbine wheel and an aeronautical propulsion system including a turbine having such a wheel.

STATE OF THE ART

An aeronautical propulsion system generally includes, from upstream to downstream in the gas flow direction, a fan section, a compressor section which can comprise a low-pressure compressor and a high-pressure compressor, a combustion chamber and a turbine section which can comprise a high-pressure turbine and a low-pressure turbine.

When the propulsion system is in operation, the high-pressure compressor is driven in rotation by the high-pressure turbine via a high-pressure shaft. The fan and, where applicable, the low-pressure compressor are driven in rotation by the low-pressure turbine via a low-pressure shaft.

One of the objectives of the technological research is to improve the environmental performances of the aircrafts. This is why, in all the design and development phases, the relevant factors are taken into account to obtain aeronautical components and products that are less energy-intensive, more respectful of the environment and whose integration and use in the civil aviation have moderate environmental consequences, with the aim of improving the energy efficiency of the aircrafts.

For example, in order to improve the propulsive efficiency of an aeronautical propulsion system and reduce its specific consumption, it has been found that it is advantageous to increase the rotation speed of the low-pressure turbine and the low-pressure compressor, and to reduce the rotation speed of the fan. Likewise, in order to limit the drag and mass of the aircraft, and thus reduce its fuel consumption, it has been found that it is advantageous to make the propulsion systems more compact, that is to say to reduce the bulk of all or part of their components.

However, in doing so, it appears that the rotating components of the aeronautical propulsion systems, in particular those present within the compressor section and the turbine section, are subjected to increased centrifugal forces, while having smaller dimensions, which is likely to alter their mechanical strength and/or limit their lifespan.

SUMMARY OF THE INVENTION

One aim of the present disclosure is to reduce the fuel consumption of an aeronautical propulsion system without limiting the lifespan of its rotating components.

This aim is achieved within the framework of the present invention thanks to a turbine blade intended to be mounted about a longitudinal axis in a slot which opens out at the outer periphery of a rotor disk of a movable wheel of an aeronautical propulsion system, the rotor disk being intended to be centered on the longitudinal axis and to comprise a plurality of blades circumferentially distributed at the outer periphery of the rotor disk, the aeronautical propulsion system being intended to comprise a drive shaft and the movable wheel being configured to drive in rotation the drive shaft about the longitudinal axis, the turbine movable disk being intended to have an upstream surface, a downstream surface, and each slot of the disk being intended to be delimited by a slot bottom surface, the turbine blade extending radially with respect to the longitudinal axis and comprising a root, a shroud, and an aerodynamically profiled airfoil extending radially from the root to the shroud, the root of the turbine blade being configured to be mounted in a slot of the plurality of slots to attach the turbine blade to the turbine movable disk, the aerodynamically profiled airfoil having a leading edge and a trailing edge, wherein the shroud comprises a platform which has a radially inner surface intended to delimit a gas circulation flowpath, wherein the root comprises a platform which has a radially outer surface also intended to delimit the gas circulation flowpath, and wherein a parameter $$\frac{F}{sL}$$

is defined as:

$$\frac{F}{sL} = N2S \times Rm \times H \times Z \times \frac{\pi^2 w^2}{900 \times Rj \times Lj}$$

with:

$$N2S = \pi(Re^2 - Ri^2) \times w^2$$

and:

$$Rm = \frac{Re + Ri}{2}$$

where:

Z is the number of blades of the plurality of blades intended to be mounted at the outer periphery of the rotor disk, Re is an outer flowpath radius, the outer flowpath radius being defined as an average of a first radial distance and of a second radial distance, the first radial distance being a distance between the longitudinal axis and a corner point between the radially inner surface of the shroud platform and the leading edge, and the second radial distance being a distance between the longitudinal axis and a corner point between the radially inner surface of the shroud platform and the trailing edge, in meters, Ri is an inner flowpath radius, the inner flowpath radius being defined as an average of a third radial distance and of a fourth radial distance, the third radial distance being a distance between the longitudinal axis and a corner point between the radially outer surface of the root platform and the leading edge, and the fourth radial distance being a distance between the longitudinal axis and a corner point between the radially outer surface of the root platform of the disk and the trailing edge, in meters, H is a flowpath height, the flowpath height being defined as a difference between the outer flowpath radius Re and the inner flowpath radius Ri, in meters, w is a limit rotation speed intended to be reached by the drive shaft in operation when the aeronautical propulsion system operates at maximum constant power, in revolutions per minute, Rj is a rim radius, the rim radius being defined as the smallest radial distance between the longitudinal axis and the slot bottom surface, in meters, Lj is a rim thickness, the rim thickness being defined as an axial distance between a corner point of the upstream surface of the disk and the slot bottom surface, and a corner point of the downstream surface of the disk and the slot bottom surface, in meters, the turbine blade being intended to be subjected to a temperature T when the drive shaft rotates at the limit rotation speed w, and wherein Re and Ri are chosen such that:

$$\frac{F}{sL} > a \times T + b$$

where a=−0.6976 and b=744.65, T being in degrees Celsius, N2S being in $10^6$ rpm$^2$·m$^2$ and $$\frac{F}{sL}$$

being in $10^8$ Newtons per cubic meter ($10^8$ N/m$^3$), the outer flowpath radius Re being comprised in a range from 0.15 to 1.0 meters and the inner flowpath radius Ri being comprised in a range from 0.1 to 0.8 meters.

The turbine blade can have one of the following characteristics:

In one embodiment, the outer flowpath radius Re and the inner flowpath radius Ri are chosen such that:

$$\frac{F}{sL} > a \times T + b$$

where a=−0.6976 and b=844.65, T being in degrees Celsius, N2S being in $10^6$ rpm$^2$·m$^2$ and $$\frac{F}{sL}$$

being in $10^8$ Newtons per cubic meter ($10^8$ N/m$^3$).

In one embodiment the shroud is formed of a material, and has a difficulty σ defined as:

$$\sigma = \rho \times \frac{\pi^2}{4} \times \frac{Re^3}{Z^2} \times \left(\frac{\pi w}{30}\right)^2$$

where:

ρ is a density of the material in kilograms per cubic meter, the turbine blade being intended to be subjected to a temperature T when the drive shaft rotates at the limit rotation speed w, and ρ and Re are chosen such that:
 if the temperature T is lower than 759° C.: σ>25×10$^4$,
 if the temperature T is in the range from 759° C. to 1,083° C.: σ>a×T+b, where a=−524.69, b=6.4823971×10$^5$, T being in degrees Celsius,
 if the temperature T is in the range from 1,083° C. to 1,117° C.: σ>c×T+d, where c=−3846.2, d=4.24543504×10$^6$, and T being in degrees Celsius, and
 if the temperature T is greater than 1,117° C.: σ>0, and the density of the material ρ is comprised in a range from 2 to 10 kilograms per cubic meter.

In one embodiment, ρ and Re are chosen such that:
 if the temperature T is lower than 759° C.: σ>37×10$^4$,
 for a temperature T ranging from 759° C. to 1,083° C.: σ>a×T+b, where a=−524.69, b=7.68241×10$^5$, T being in degrees Celsius,
 for a temperature T ranging from 1,083° C. to 1,135° C.: σ>c×T+d, where c=−3846.2, d=4.365370×10$^6$, T being in degrees Celsius, and
 for a temperature T greater than 1,135° C.: σ>0.

In one embodiment, a parameter N2S is defined as: N2S=π(Re$^2$−Ri$^2$)×w$^2$, and the outer flowpath radius Re and the inner flowpath radius Ri are chosen such that:
 if the temperature T is lower than or equal to 700° C.: N2S>33.7×10$^6$ rpm$^2$·m$^2$,
 if the temperature T is greater than 700° C.: N2S>a×T+b, where a=−0.055 and b=72.2, T being in degrees Celsius and N2S being in 10$^6$ rpm$^2$·m$^2$.

In one embodiment, the outer flowpath radius Re and the inner flowpath radius Ri are chosen such that:
 if the temperature T is lower than or equal to 700° C.: N2S>44×10$^6$ rpm$^2$·m$^2$,
 if the temperature T is greater than 700° C.: N2S>a×T+b, where a=−0.055 and b=82.5, T being in degrees Celsius and N2S being in 10$^6$ rpm$^2$·m$^2$.

In one embodiment, the outer flowpath radius Re and the inner flowpath radius Ri are chosen such that:

$$\frac{Ri}{Re} > a \times N2S + b$$

with:

$$N2S = \pi(Re^2 - Ri^2) \times w^2$$

where:
a=−0.0057, and
b=0.7561,
N2S being in 10$^6$ rpm$^2$·m$^2$.

In one embodiment, the outer flowpath radius Re and the inner flowpath radius Ri are chosen such that:

$$\frac{Ri}{Re} > a \times N2S + b$$

a=−0.0057, and
b=0.8561,
N2S being in 10$^6$ rpm$^2$·m$^2$.

In one embodiment, Cx$_{tip}$ is a blade tip chord length, the blade tip chord length being defined as a distance between a first point and a second point, the first point being a corner point between the radially inner surface of the shroud platform and the leading edge of the aerodynamically profiled airfoil, and the second point being a corner point between the radially inner surface of the shroud platform and the trailing edge of the aerodynamically profiled airfoil, $Cx_{root}$ is a blade root chord length, the blade root chord length being defined as a distance between a third point and a fourth point, the third point being a corner point between the radially outer surface of the root platform and the leading edge of the aerodynamically profiled airfoil, and the fourth point being a corner point between the radially outer surface of the root platform and the trailing edge of the aerodynamically profiled airfoil, a parameter N2S is defined as:

$$N2S = \pi(Re^2 - Ri^2) \times w^2$$

and the blade tip chord length $Cx_{tip}$, the blade root chord length $Cx_{root}$, the outer flowpath radius Re and the inner flowpath radius Ri are chosen such that:
if $$N2S < 15: 0.2 < \frac{Cx_{tip}}{Cx_{root}} < a \times N2S + b,$$

where a=−0.0267 and b=1.15, and
if $$N2S \geq 15: \frac{Cx_{tip}}{Cx_{root}} \in [0.2; 0.75],$$

N2S being in $10^6$ rpm$^2 \cdot$m$^2$, and wherein the blade tip chord length $Cx_{tip}$ is comprised in a range from 0.005 meters to 0.05 meters and the blade root chord length $Cx_{root}$ is comprised in a range from 0.01 meters to 0.05 meters.

In one embodiment, the blade tip chord length $Cx_{tip}$, the blade root chord length $Cx_{root}$, the outer flowpath radius Re and the inner flowpath radius Ri are chosen such that:
if $$N2S < 15 : 0.2 < \frac{Cx_{tip}}{Cx_{root}} < a \times N2S + b,$$

where a=−0.0267 and b=1, and
if $$N2S \geq 15: \frac{Cx_{tip}}{Cx_{root}} \in [0.2; 0.6],$$

N2S being in $10^6$ rpm$^2 \cdot$m$^2$.

The invention also relates to a low-pressure movable turbine wheel of an aeronautical propulsion system, the movable wheel comprising a rotor disk centered on a longitudinal axis and a plurality of turbine blades as defined previously, the root of each of the turbine blades being mounted in a respective slot of the rotor disk which opens out at the outer periphery of the rotor disk, and the movable wheel being configured to be driven in rotation by a drive shaft movable in rotation about the longitudinal axis of the aeronautical propulsion system, the movable wheel comprising exactly a number Z of turbine blades, Z being comprised in a range from 30 to 180, the rotor disk having a rim radius Rj comprised in a range from 0.05 meters to 0.5 meters and a rim thickness Lj comprised in a range from 0.01 meters to 0.06 meters.

The invention also relates to an aeronautical propulsion system comprising a low-pressure turbine and a drive shaft driven in rotation by the low-pressure turbine about a longitudinal axis, the low-pressure turbine comprising the movable wheel as defined previously, the drive shaft having a limit rotation speed w intended to be reached by the drive shaft in operation when the aeronautical propulsion system operates at maximum constant power, the limit rotation speed w being comprised in a range from 2,000 to 30,000 revolutions per minute.

The invention also relates to a method for dimensioning a turbine blade intended to be mounted about a longitudinal axis in a slot which opens out at the outer periphery of a rotor disk of a movable wheel of a low-pressure turbine of an aeronautical propulsion system, the rotor disk being intended to be centered on the longitudinal axis and to comprise a plurality of blades circumferentially distributed at the outer periphery of the rotor disk, the aeronautical propulsion system being intended to comprise a drive shaft and the movable wheel being configured to drive in rotation the drive shaft about the longitudinal axis, the turbine blade extending radially with respect to the longitudinal axis and comprising a root configured to be mounted in the slot of the rotor disk, a shroud, and an aerodynamically profiled airfoil extending radially from the root to the shroud, the aerodynamically profiled airfoil having a leading edge and a trailing edge, the shroud comprising a platform which has a radially inner surface intended to delimit a gas circulation flowpath, wherein the root comprises a platform which has a radially outer surface also intended to delimit the gas circulation flowpath, and a parameter $$\frac{F}{sL}$$

being defined as:

$$\frac{F}{sL} = N2S \times Rm \times H \times Z \times \frac{\pi^2 w^2}{900 \times Rj \times Lj}$$

with:

$$N2S = \pi(Re^2 - Ri^2) \times w^2$$

and:

$$Rm = \frac{Re + Ri}{2}$$

where:
Z is the number of blades of the plurality of blades intended to be mounted at the outer periphery of the rotor disk,
Re is an outer flowpath radius, the outer flowpath radius being defined as an average of a first radial distance and of a second radial distance, the first radial distance being a distance between the longitudinal axis and a corner point between the radially inner surface of the shroud platform and the leading edge, and the second radial distance being a distance between the longitudinal axis and a corner point between the radially inner surface of the shroud platform and the trailing edge, in meters, Ri is an inner flowpath radius, the inner flowpath radius being defined as an average of a third radial distance and of a fourth radial distance, the third radial distance being a distance between the longitudinal axis and a corner point between the radially outer surface of the root platform and the leading edge, and the fourth radial distance being a distance between the longitudinal axis and a corner point between the radially outer surface of the root platform and the trailing edge, in meters, H is a flowpath height, the flowpath height being defined as a difference between the outer flowpath radius Re and the inner flowpath radius Ri, in meters, w is a limit rotation speed intended to be reached by the drive shaft in operation when the aeronautical propulsion system operates at maximum constant power, in revolutions per minute, Rj is a rim radius, the rim radius being defined as the smallest radial distance between the longitudinal axis and the slot bottom surface, in meters, Lj is a rim thickness, the rim thickness being defined as an axial distance between a corner point of the upstream surface of the disk and the slot bottom surface, and a corner point of the downstream surface of the disk and the slot bottom surface, in meters, the turbine blade being intended to be subjected to a temperature T when the drive shaft rotates at the limit rotation speed w, and the method comprising a step of dimensioning the turbine blade during which Re and Ri are chosen such that:

$$\frac{F}{sL} > a \times T + b$$

where a=−0.6976 and b=744.65, T being in degrees Celsius, N2S being in $10^6$ rpm²·m² and $$\frac{F}{sL}$$

being in $10^8$ Newtons per cubic meter ($10^8$ N/m³), the outer flowpath radius Re being comprised in a range from 0.15 to 1.0 meters and the inner flowpath radius Ri being comprised in a range from 0.1 to 0.8 meters.

In one embodiment, Re and Ri are chosen such that:

$$\frac{F}{sL} > a \times T + b$$

where a=−0.6976 and b=844.65, T being in degrees Celsius, N2S being in $10^6$ rpm²·m² and $$\frac{F}{sL}$$

being in $10^8$ Newtons per cubic meter ($10^8$ N/m³).

In one embodiment, the shroud is formed of a material, and has a difficulty σ defined as:

$$\sigma = \rho \times \frac{\pi^2}{4} \times \frac{Re^3}{Z^2} \times \left(\frac{\pi w}{30}\right)^2$$

where:

ρ is a density of the material in kilograms per cubic meter, the turbine blade being intended to be subjected to a temperature T when the drive shaft rotates at the limit rotation speed w, the method comprising a step of dimensioning the turbine blade during which ρ and Re are chosen such that:
- if the temperature T is lower than 759° C.: σ>25×10⁴,
- if the temperature T is in the range from 759° C. to 1,083° C.: σ>a×T+b, where a=−524.69, b=6.4823971×10⁵, T being in degrees Celsius,
- if the temperature T is in the range from 1,083° C. to 1,117° C.: σ>c×T+d, where c=−3846.2, d=4.24543504×10⁶, and T being in degrees Celsius, and
- if the temperature T is greater than 1,117° C.: σ>0, the density of the material ρ being comprised in a range from 2 to 10 kilograms per cubic meter.

In one embodiment, p and Re are chosen such that:
- if the temperature T is lower than 759° C.: σ>37×10⁴,
- for a temperature T ranging from 759° C. to 1,083° C.: σ>a×T+b, where a=−524.69, b=7.68241×10⁵, T being in degrees Celsius,
- for a temperature T ranging from 1,083° C. to 1,135° C.: σ>c×T+d, where c=−3846.2, d=4.365370×10⁶, T being in degrees Celsius, and
- for a temperature T greater than 1,135° C.: σ>0.

In one embodiment, a parameter N2S is defined as:

$$N2S = \pi(Re^2 - Ri^2) \times w^2,$$

the method comprising a step of dimensioning the turbine blade during which the outer flowpath radius Re and the inner flowpath radius Ri are chosen such that:
- if the temperature T is lower than or equal to 700° C.: N2S>33.7×10⁶ rpm²·m²,
- if the temperature T is greater than 700° C.: N2S>a×T+b, where a=−0.055 and b=72.2, T being in degrees Celsius and N2S being in $10^6$ rpm²·m².

In one embodiment, the outer flowpath radius Re and the inner flowpath radius Ri are chosen such that:
- if the temperature T is lower than or equal to 700° C.: N2S>44×10⁶ rpm²·m²,
- if the temperature T is greater than 700° C.: N2S>a×T+b, where a=−0.055 and b=82.5, T being in degrees Celsius and N2S being in $10^6$ rpm²·m².

In one embodiment, the method comprises a step of dimensioning the turbine blade during which the outer flowpath radius Re and the inner flowpath radius Ri are chosen such that:

$$\frac{Ri}{Re} > a \times N2S + b$$

with:

$$N2S = \pi(Re^2 - Ri^2) \times w^2$$

where:
a=−0.0057, and
b=0.7561,
N2S being in $10^6$ rpm$^2$·m$^2$.

In one embodiment, the outer flowpath radius Re and the inner flowpath radius Ri are chosen such that:

$$\frac{Ri}{Re} > a \times N2S + b$$

where a=−0.0057, and b=0.8561, N2S being in $10^6$ rpm$^2$·m$^2$.

In one embodiment, Cx$_{tip}$ is a blade tip chord length, the blade tip chord length being defined as an axial distance between a first point and a second point, the first point being a corner point between the radially inner surface of the shroud platform and the leading edge of the aerodynamically profiled airfoil, and the second point being a corner point between the radially inner surface of the shroud platform and the trailing edge of the aerodynamically profiled airfoil, Cx$_{root}$ is a blade root chord length, the blade root chord length being defined as an axial distance between a third point and a fourth point, the third point being a corner point between the radially outer surface of the root platform and the leading edge of the aerodynamically profiled airfoil, and the fourth point being a corner point between the radially outer surface of the root platform and the trailing edge of the aerodynamically profiled airfoil, and wherein a parameter N2S is defined as:

$$N2S = \pi(Re^2 - Ri^2) \times w^2$$

the method comprising a step of dimensioning the turbine blade during which the blade tip chord length Cx$_{tip}$, the blade root chord length Cx$_{root}$, the outer flowpath radius Re and the inner flowpath radius Ri are chosen such that:
if $$N2S < 15: 0.2 < \frac{Cx_{tip}}{Cx_{root}} < a \times N2S + b,$$

where a=−0.0267 and b=1.15, and
if $$N2S \geq 15: \frac{cx_{tip}}{Cx_{root}} \in [0.2; 0.75],$$

N2S being in $10^6$ rpm$^2$·m$^2$,
the blade tip chord length Cx$_{tip}$ being comprised in a range from 0.005 meters to 0.05 meters and the blade root chord length Cx$_{root}$ being comprised in a range from 0.01 meters to 0.05 meters.

In one embodiment, the blade tip chord length Cx$_{tip}$, the blade root chord length Cx$_{root}$, the outer flowpath radius Re and the inner flowpath radius Ri are chosen such that:
if $$N2S < 15: 0.2 < \frac{Cx_{tip}}{Cx_{root}} < a \times N2S + b,$$

where a=−0.0267 and b=1, and
if $$N2S \geq 15: \frac{Cx_{tip}}{Cx_{root}} \in [0.2; 0.6],$$

N$_2$S being in $10^6$ rpm$^2$·m$^2$.

The invention also relates to a turbine blade manufactured using a dimensioning method as defined previously.

PRESENTATION OF THE DRAWINGS

Figure 2:
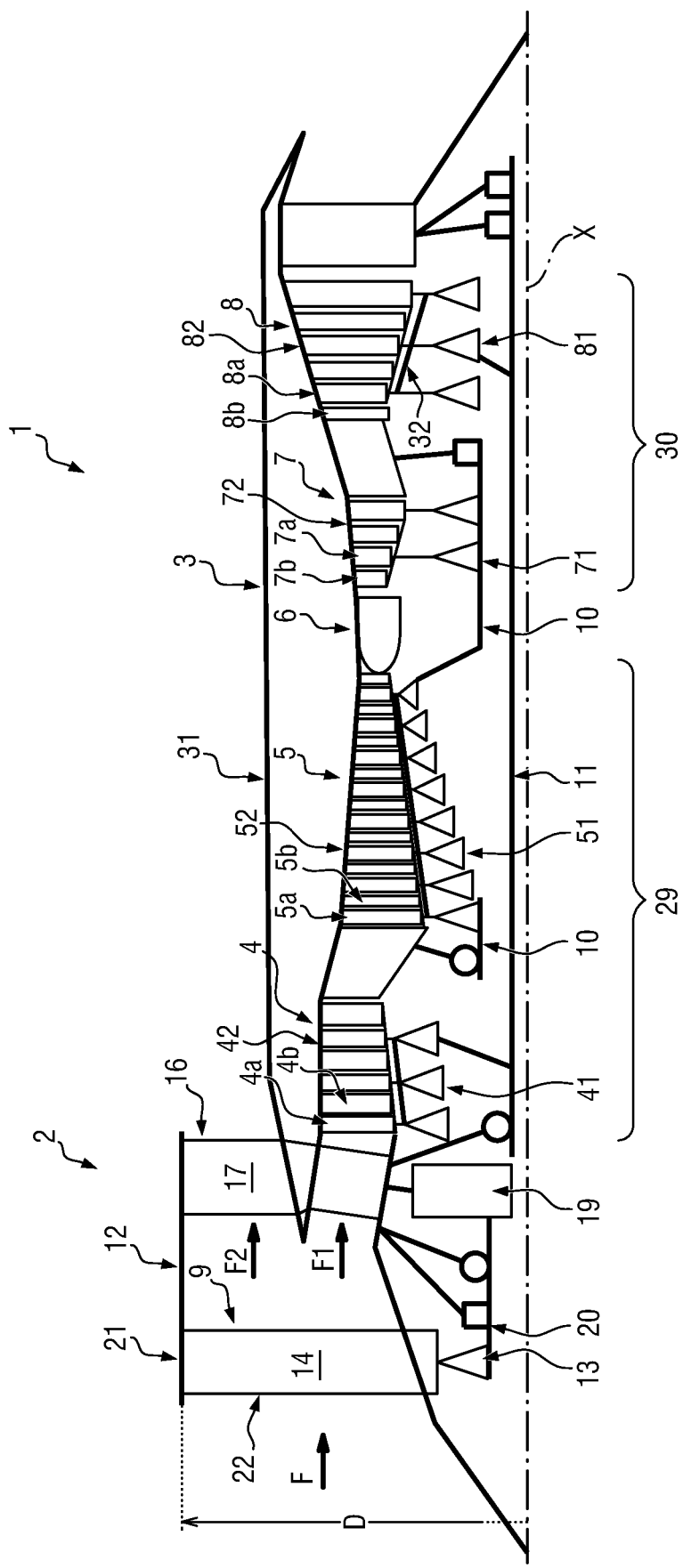
Figure 3:
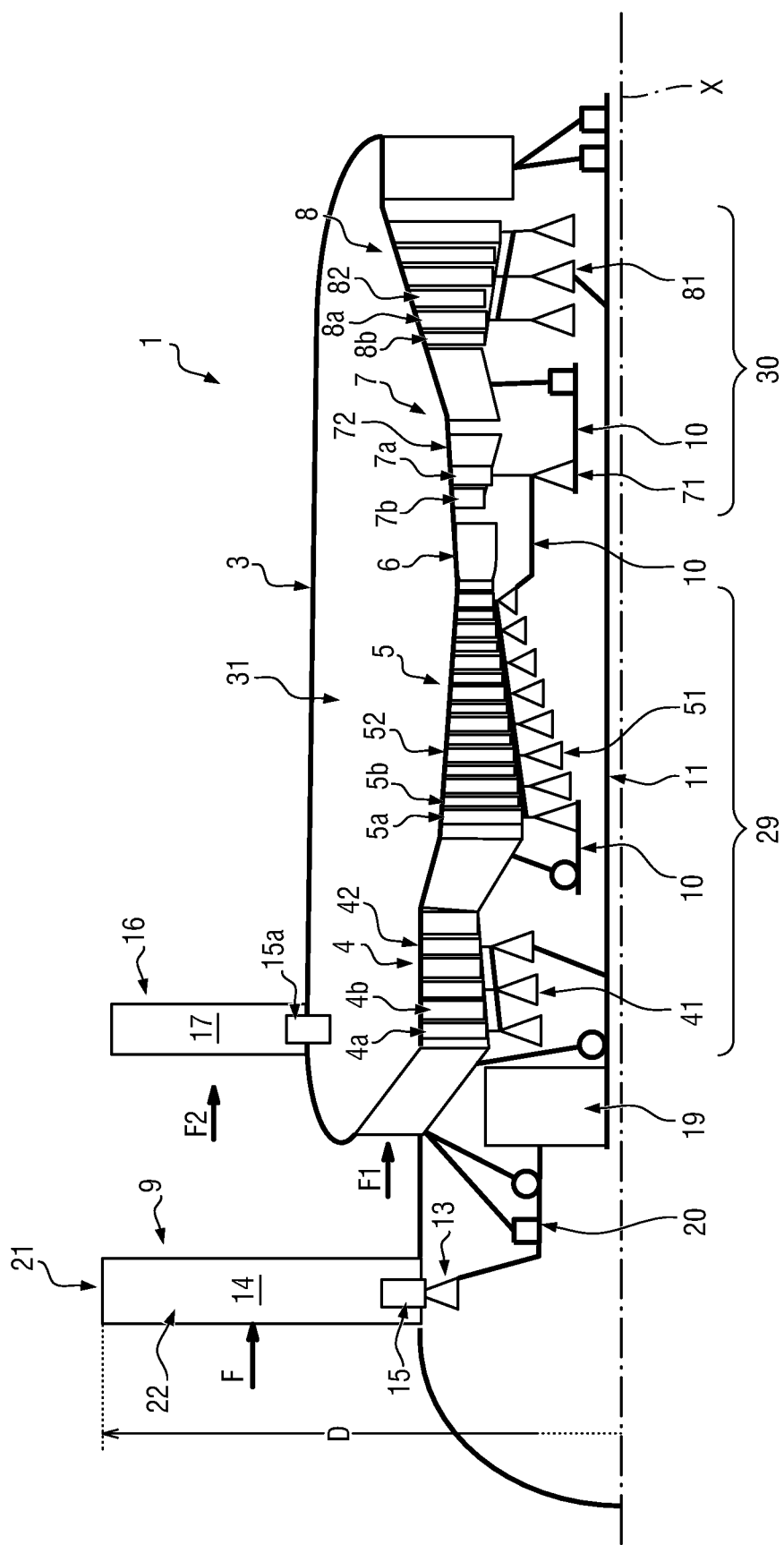
Figure 4:
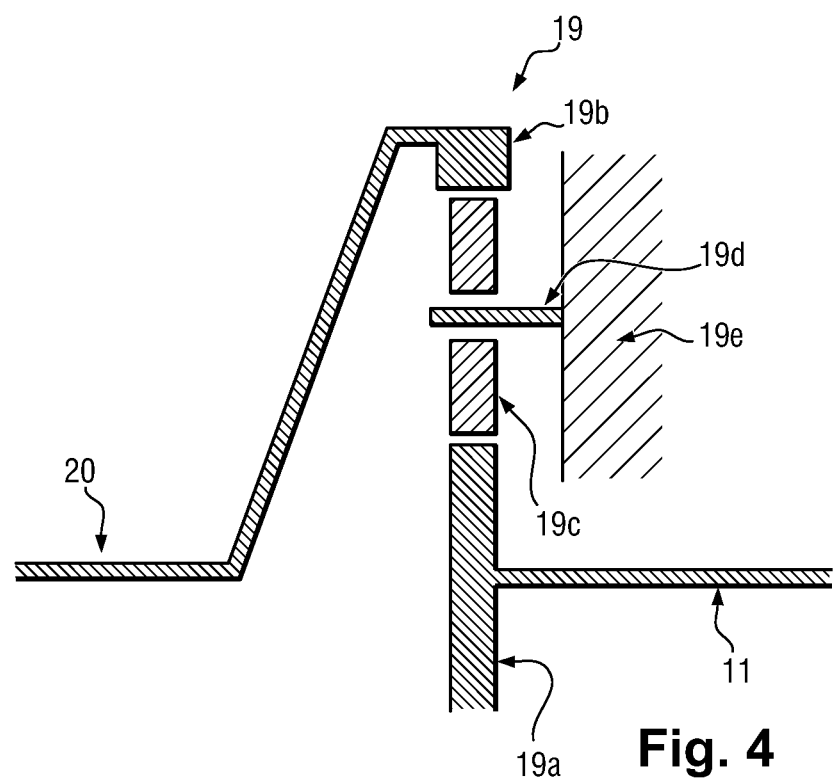
Figure 5:
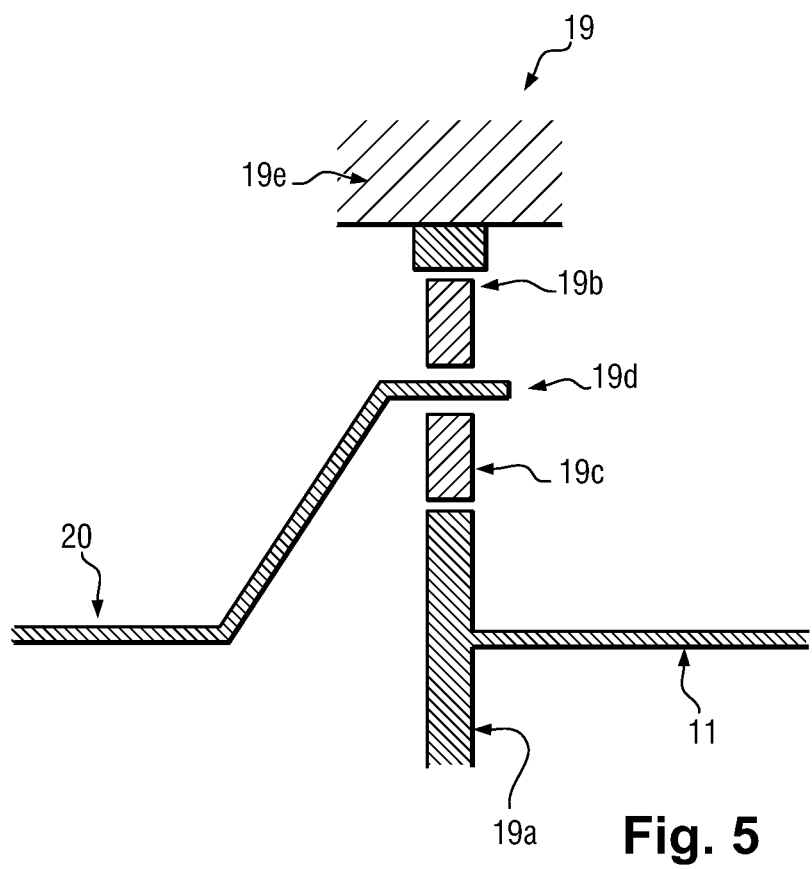
Figure 6:
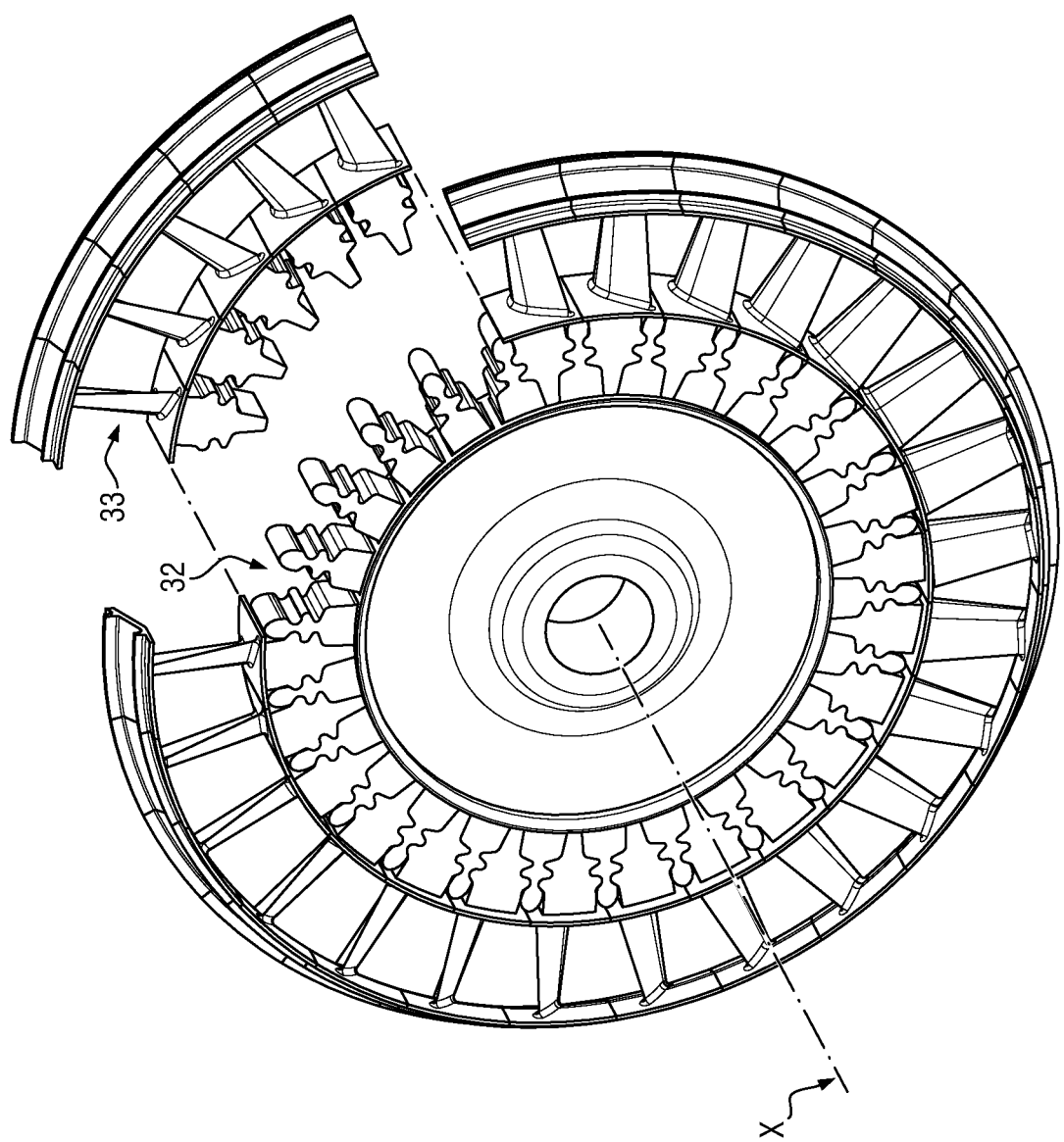
Figure 7:
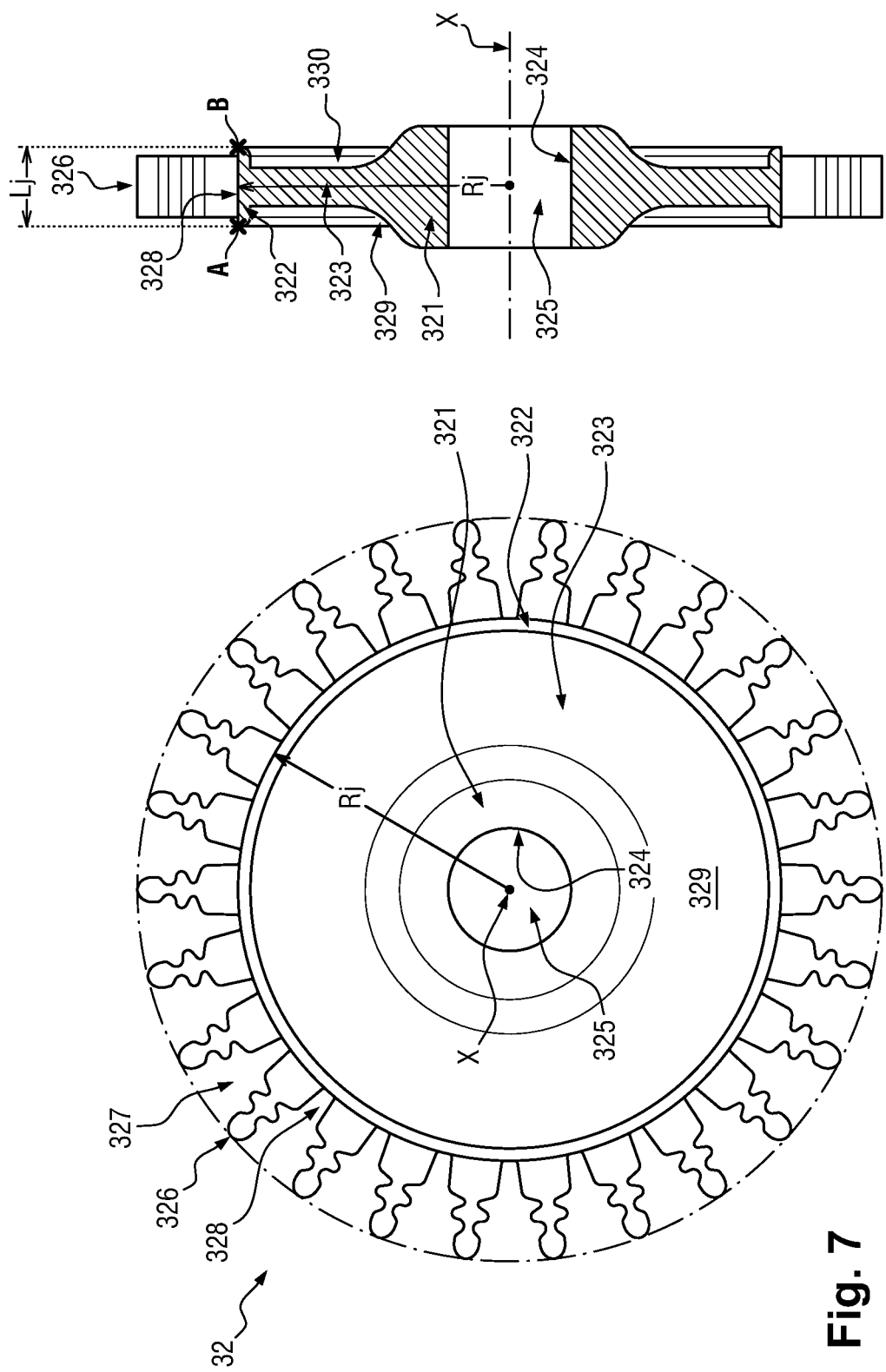
Figure 9:
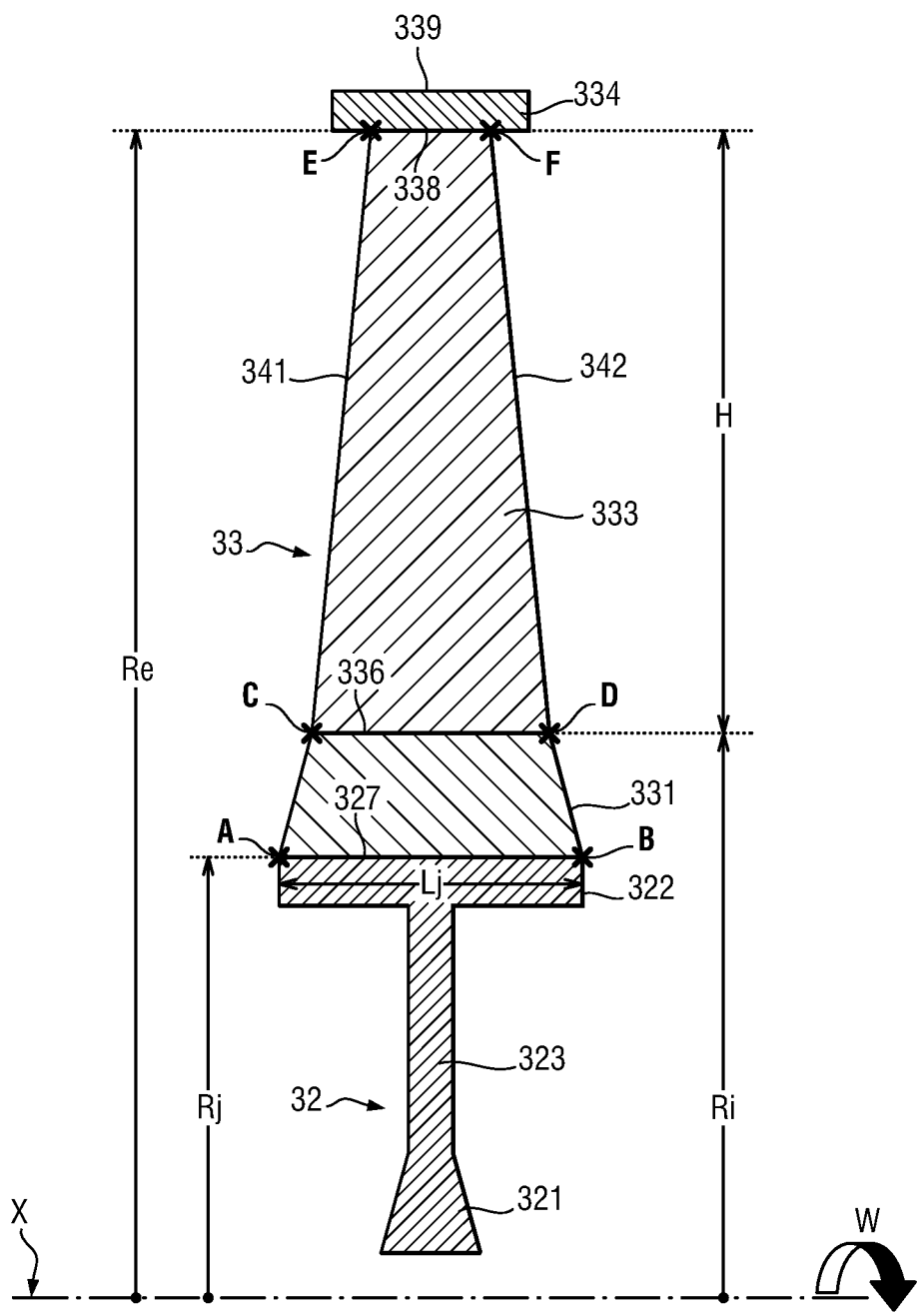
Figure 10:
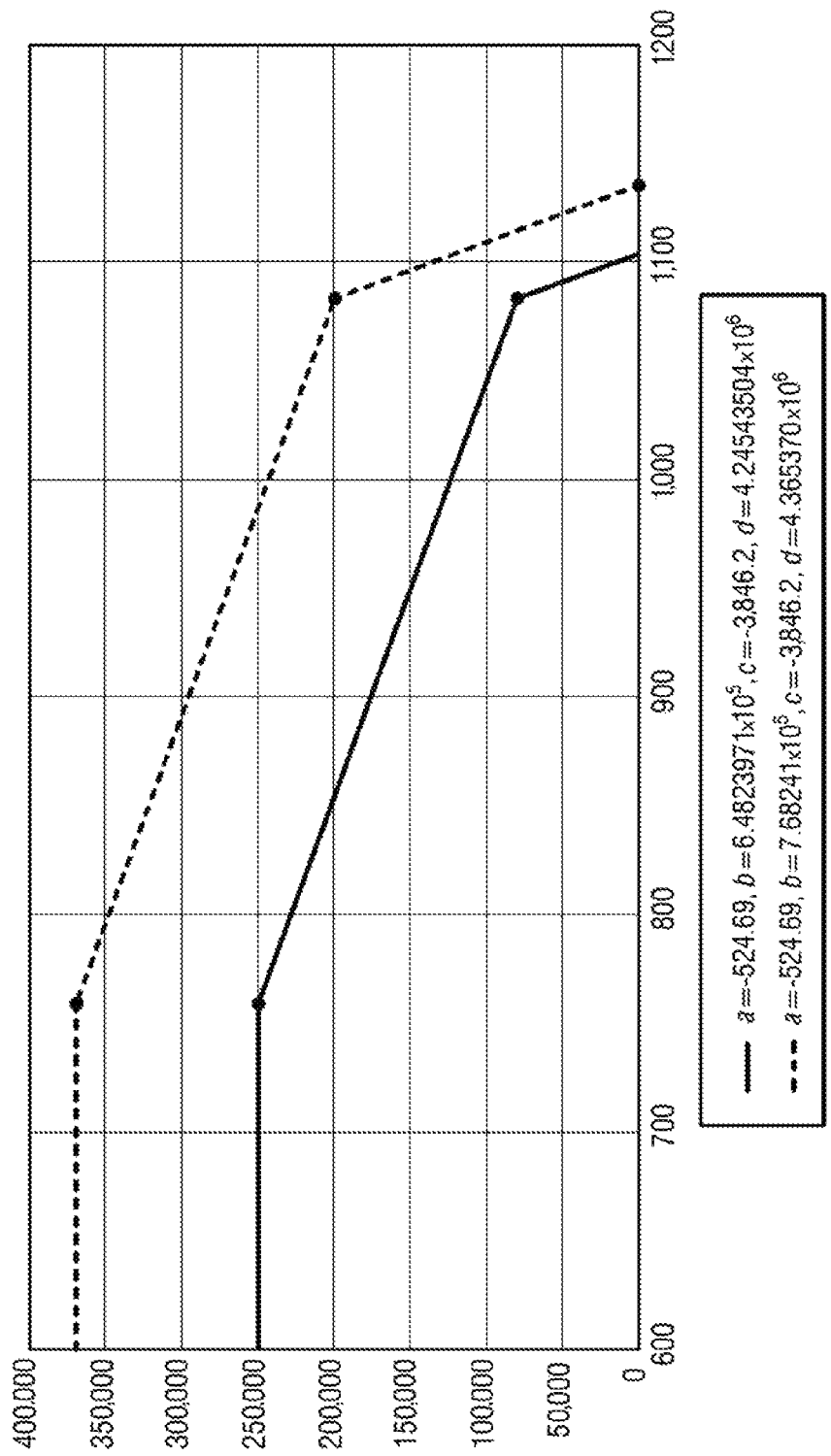
Figure 11:
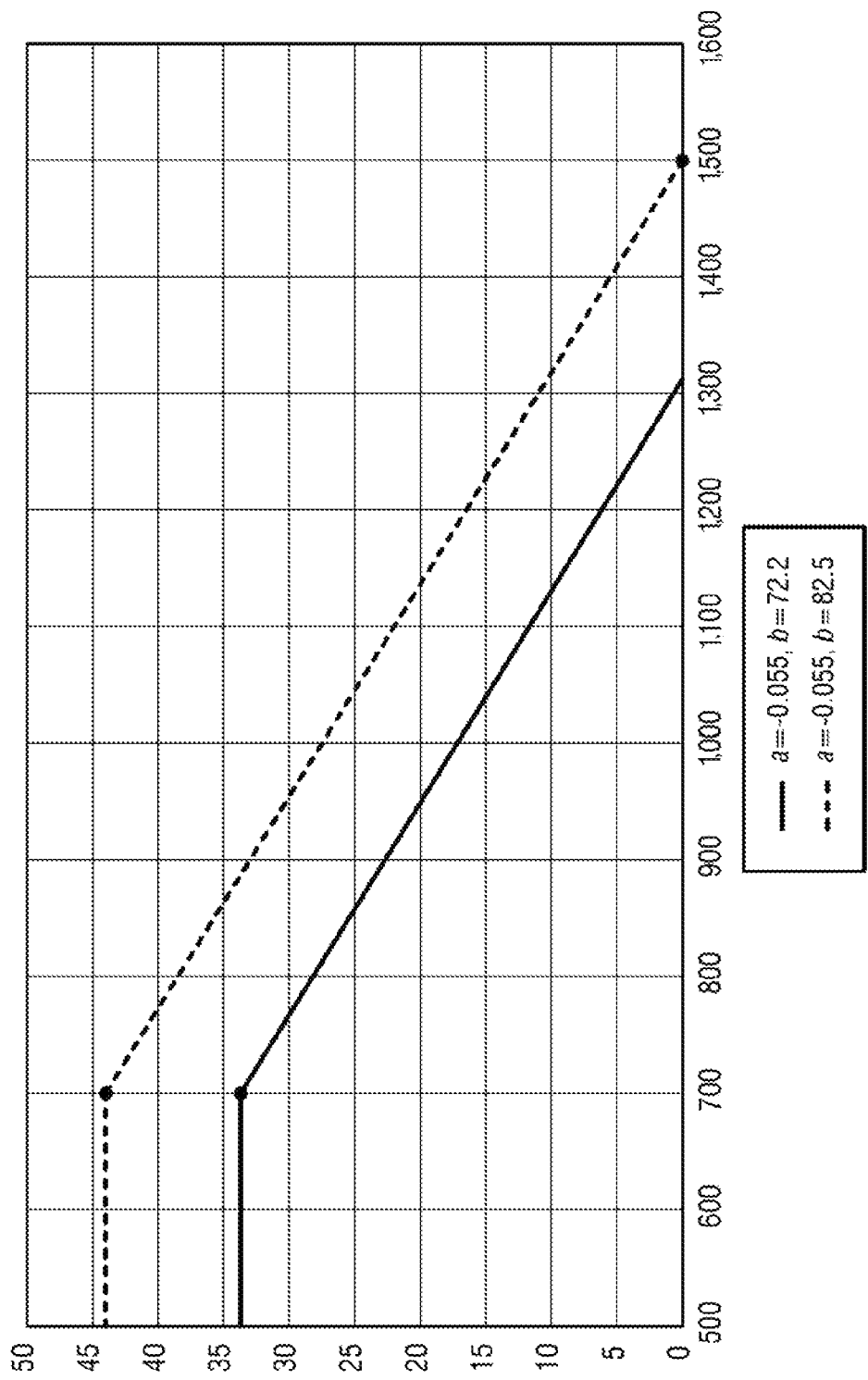
Figure 12:
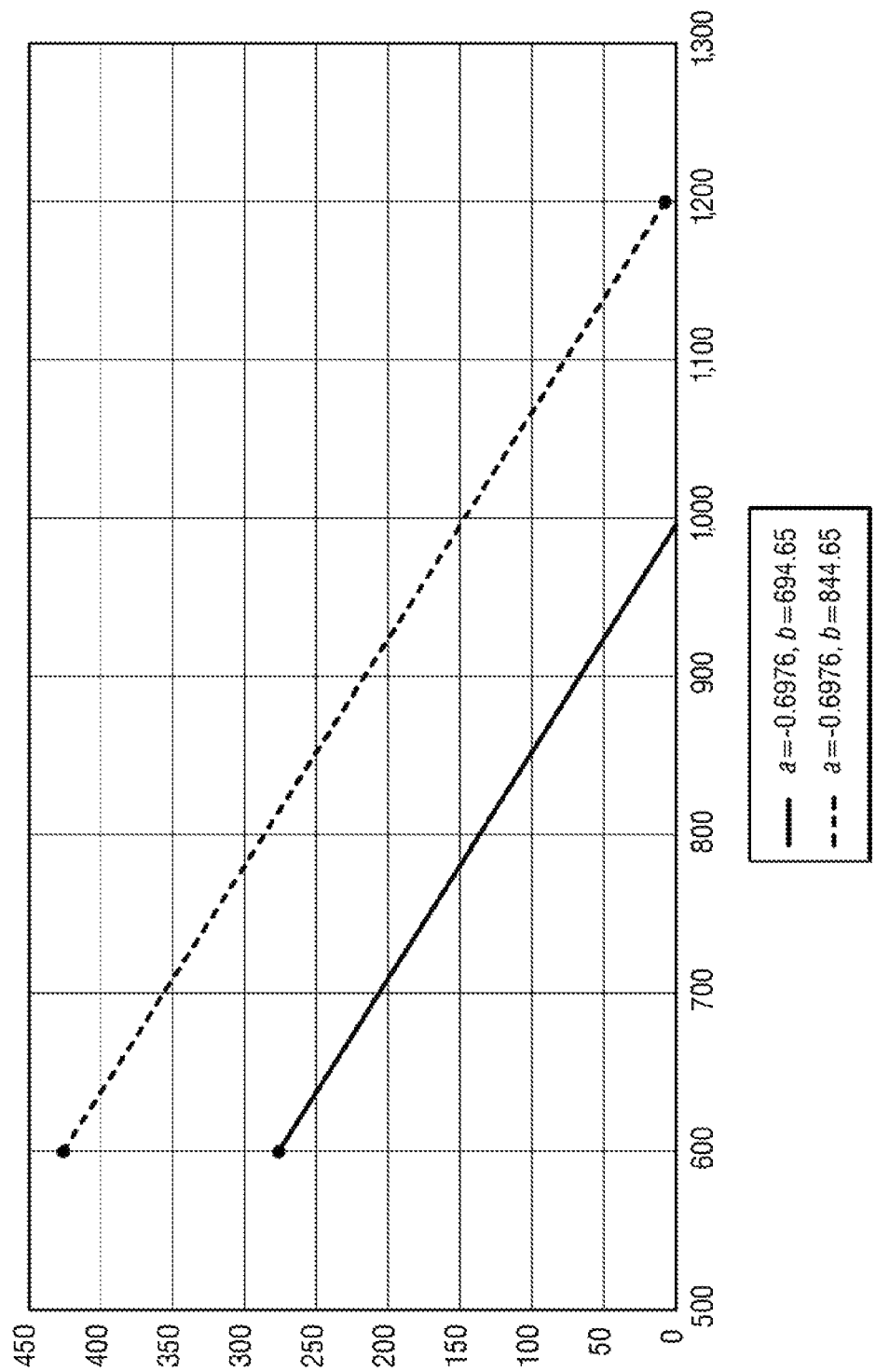
Figure 13:
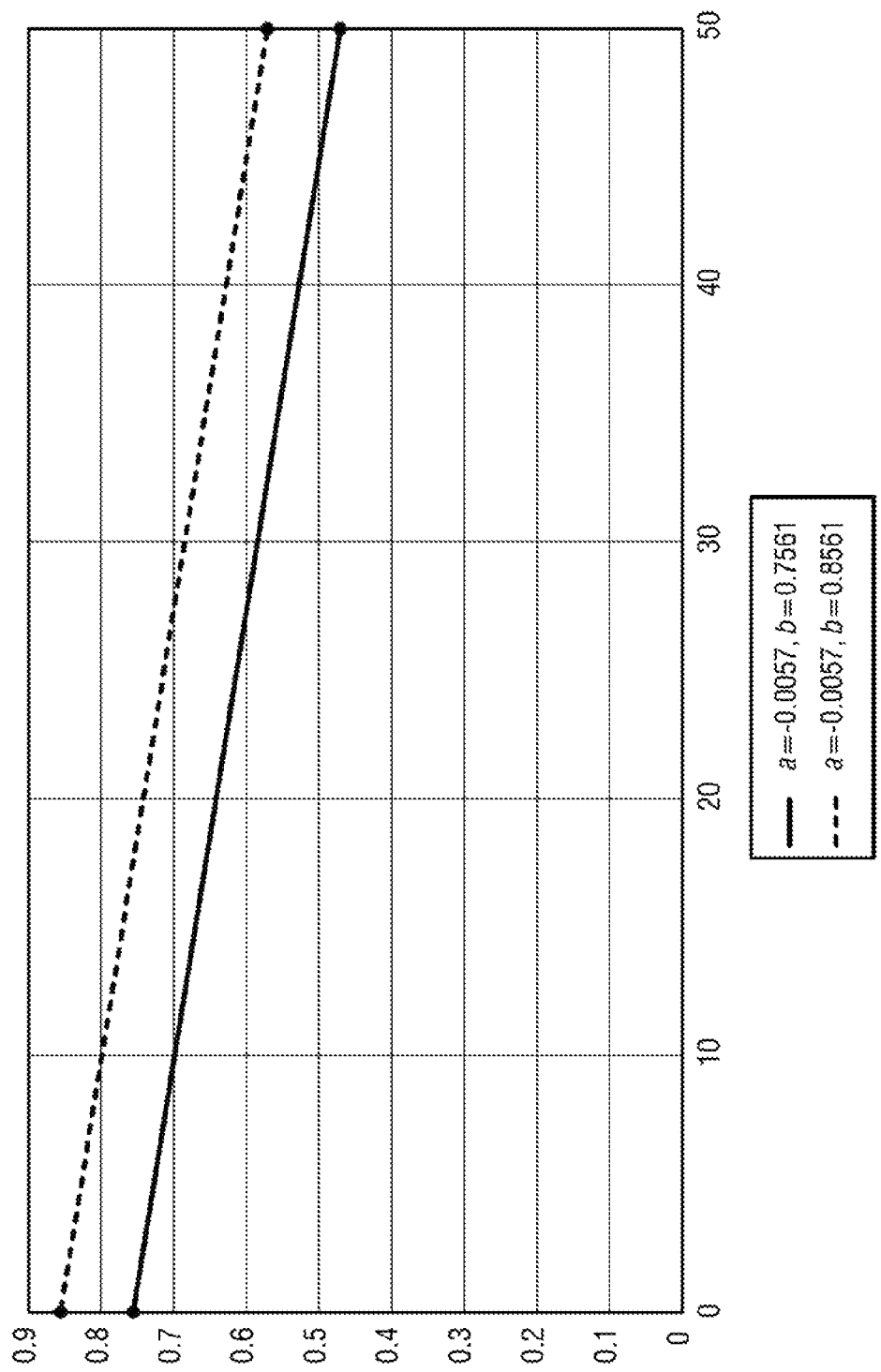
Figure 14:
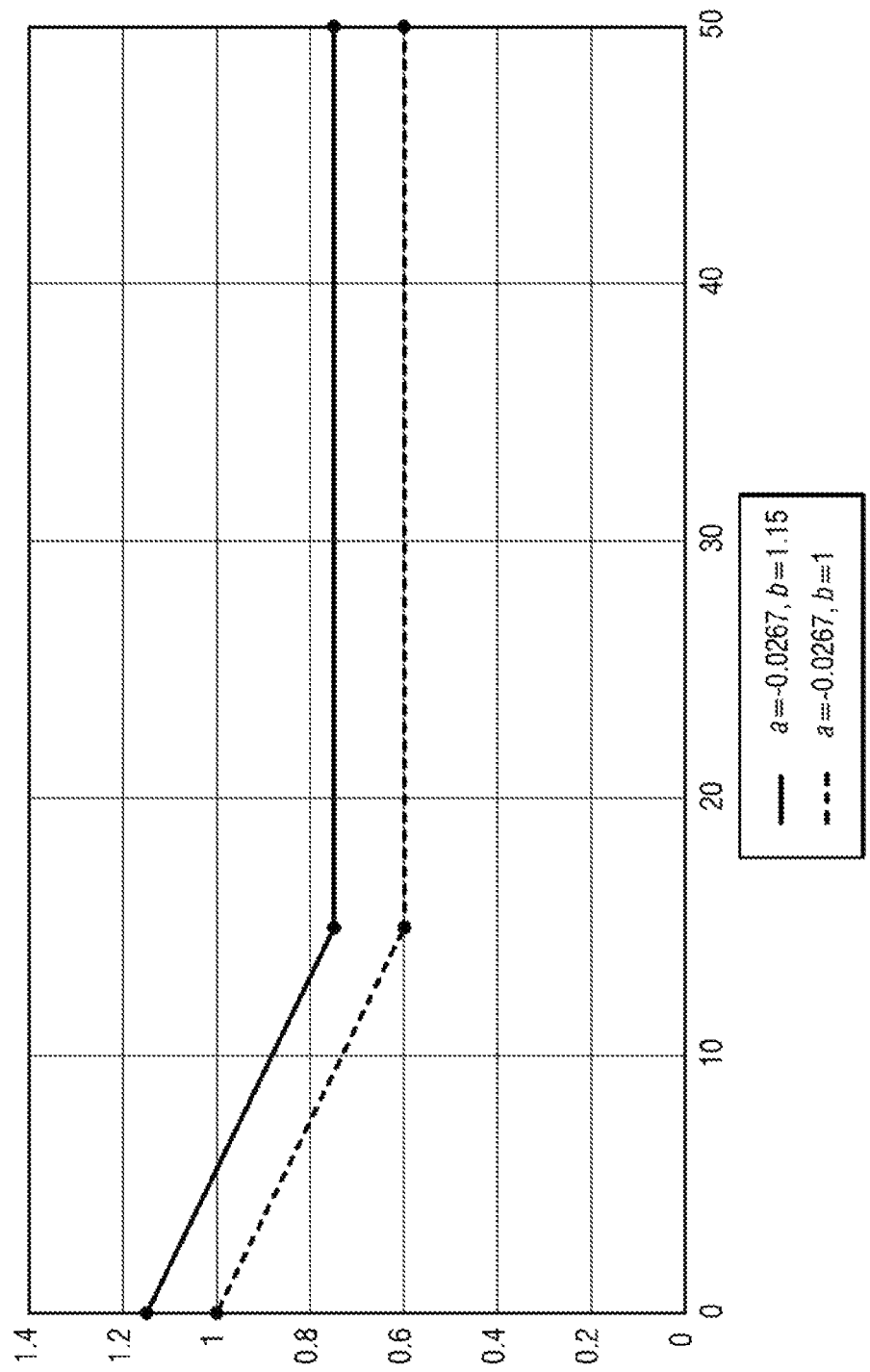

Other characteristics and advantages will emerge from the following description, which is purely illustrative and not limiting, and should be read in relation to the appended figures, among which:

FIG. 1 schematically represents an aircraft comprising propulsion systems,

FIG. 2 schematically represents a partial and sectional view of an example of a propulsion system in which the fan section is ducted, FIG. 3 schematically represents a partial and sectional view of an example of a propulsion system in which the fan section is unducted, FIG. 4 schematically represents a first example of a star gear reduction mechanism, FIG. 5 schematically represents a first example of a planetary gear reduction mechanism, FIG. 6 schematically represents a movable wheel of a low-pressure turbine, FIG. 7 schematically represents a disk of the movable wheel, FIG. 8A and FIG. 8B schematically represent a blade of the movable wheel, FIG. 9 schematically represents the dimensions of the blade FIG. 10 schematically represents a limit of difficulty of the shroud of a turbine blade, FIG. 11 schematically represents a limit of the parameter N2S of a turbine blade, FIG. 12 schematically represents a limit of difficulty of the attachment between a turbine blade and a turbine movable disk, FIG. 13 schematically represents a limit of the ratio of the inner flowpath radius and the outer flowpath radius for a turbine blade, FIG. 14 schematically represents a limit of the ratio between a blade tip chord and a blade root chord of a turbine blade.

DETAILED DESCRIPTION OF ONE EMBODIMENT

In the example illustrated in FIG. 1, the aircraft is an airplane 100 comprising a fuselage 101 and two wings 102. In this example, the aircraft comprises two propulsion systems 1, each propulsion system 1 being fixed to a respective wing 102 of the airplane 100 via a pylon. In another embodiment, the aircraft could comprise one or several propulsion system(s) fixed to the fuselage 101.

FIG. 2 schematically represents a partial and sectional view of a first example of a propulsion system 1.

In this example, the propulsion system 1 is a two-spool ducted fan gas turbine engine.

In FIG. 2, the propulsion system 1 has a main direction extending along a longitudinal axis X. The propulsion system 1 comprises a fan section 2 and a primary spool 3, often called "gas generator".

The fan section 2 comprises a fan 22 and a fan casing 12. The fan 22 comprises a fan rotor 9. The fan casing 12 surrounds the fan rotor 9. The fan rotor 9 is rotatably mounted relative to the fan casing 12.

The fan rotor 9 comprises a fan hub 13 and fan blades 14 extending radially from the fan hub 13. The fan blades 14 can be stationary relative to the fan hub 13 or have variable setting. In the latter case, each of the fan blades 14 is pivotally mounted relative to the fan hub 13 along a setting axis and is connected to a pitch change mechanism 15 mounted in the propulsion system 1. The pitch change mechanism 15 allows the setting angle of the fan blades 14 to be adjusted according to the flight phases.

The fan rotor 9 comprises at least fourteen fan blades 14 and at most twenty-four fan blades 14, preferably at least sixteen fan blades 14 and at most twenty-two fan blades 14.

Moreover, in this example, the fan section 2 also comprises a fan stator 16 fixedly mounted on the fan casing 12. The fan stator 16 comprises vanes 17 generally referred to as "outlet vanes" (or OGV, for Outlet Guide Vane). This set of vanes has the function of straightening and regulating the air stream that flows downstream of the fan rotor 9 to contribute to the thrust of the engine. This set of vanes also acts as a noise reducer.

Alternatively, the outlet vanes 17 could have variable setting. Where applicable, and similarly to the fan blades 14 of the fan rotor 9, the root of the outlet vanes 17 is pivotally mounted along a setting axis and is connected to a pitch change mechanism (not represented), the setting being adjusted according to the flight phases by the pitch change mechanism.

The number of outlet vanes 17 depends on the acoustic criteria defined for the propulsion system 1 and is at least equal to the number of fan blades 14.

The primary spool 3 comprises a compressor section 29, a combustion chamber 6 and a turbine section 30.

The compressor section 29 comprises a low-pressure compressor 4 and a high-pressure compressor 5.

The low-pressure compressor 4 comprises a rotor 41 capable of being driven in rotation relative to the casing 31 of the propulsion system 1 and a stator 42 fixedly mounted on the casing 31.

The rotor 41 of the low-pressure compressor 4 comprises movable wheels 4a and the stator 42 of the low-pressure compressor 4 comprises stationary wheels 4b. The movable wheels 4a are disposed alternating with the stationary wheels 4b, thus forming a succession of low-pressure compressor stages.

Likewise, the high-pressure compressor 5 comprises a rotor 51 capable of being driven in rotation relative to the casing 31 of the propulsion system 1 and a stator 52 fixedly mounted on the casing 31.

The rotor 51 of the high-pressure compressor 5 comprises movable wheels 5a and the stator 52 of the high-pressure compressor 5 comprises stationary wheels 5b. The movable wheels 5a are disposed alternating with the stationary wheels 5b, thus forming a succession of high-pressure compressor stages.

The turbine section 30 comprises a high-pressure turbine 7 and a low-pressure turbine 8.

The high-pressure turbine 7 comprises a rotor 71 capable of being driven in rotation relative to the casing 31 of the propulsion system 1 and a stator 72 fixedly mounted on the casing 31.

The rotor 71 of the high-pressure turbine 7 comprises movable wheels 7a and the stator 72 of the high-pressure turbine 7 comprises stationary wheels 7b. The movable wheels 7a are disposed alternating with the stationary wheels 7b, thus forming a succession of high-pressure turbine stages.

Likewise, the low-pressure turbine 8 comprises a rotor 81 capable of being driven in rotation relative to the casing 31 of the propulsion system 1 and a stator 82 fixedly mounted on the casing 31.

The rotor 81 of the low-pressure turbine 8 comprises movable wheels 8a and the stator 82 of the low-pressure turbine 8 comprises stationary wheels 8b. The movable wheels 8a are disposed alternating with the stationary wheels 8b, thus forming a succession of low-pressure turbine stages.

The propulsion system 1 comprises a low-pressure shaft 11 connecting the rotor 81 of the low-pressure turbine 8 to the rotor 41 of the low-pressure compressor 4, the low-pressure shaft 11 being rotatably mounted relative to the casing 31 about the longitudinal axis.

When the propulsion system 1 is in operation, the rotor 81 of the low-pressure turbine 8 drives in rotation the rotor 41 of the low-pressure compressor 4 via the low-pressure shaft 11.

The propulsion system 1 further comprises a fan shaft 20 and a reduction mechanism 19. The fan rotor 9 is fixedly mounted on the fan shaft 20. The reduction mechanism 19 has an inlet and an outlet. The inlet of the reduction mechanism 19 is connected to the low-pressure shaft 11 and the outlet of the reduction mechanism 19 is connected to the fan shaft 20. Thus, when the propulsion system 1 is in operation, the rotor 81 of the low-pressure turbine 8 drives in rotation not only the rotor 41 of the low-pressure compressor 4, but also the fan rotor 9, via the low-pressure shaft 11, the reduction mechanism 19 and the fan shaft 20.

Thanks to the reduction mechanism 19, the fan rotor 9 is driven in rotation at a speed lower than the rotation speed of the rotor 81 of the low-pressure turbine 8 and at the rotation speed of the rotor 41 of the low-pressure compressor 4.

The reduction mechanism 19 thus makes it possible to independently control the rotation speed of the fan 22 and the rotation speed of the low-pressure turbine 8 and of the low-pressure compressor 4.

The low-pressure turbine 8, the low-pressure shaft 11, the low-pressure compressor 4, the fan shaft 20, the reduction mechanism 19 and the fan 22 together form the "low-pressure spool" of the propulsion system 1.

The propulsion system 1 further comprises a high-pressure shaft 10 connecting the rotor 71 of the high-pressure turbine 7 to the rotor 51 of the high-pressure compressor 5, the high-pressure shaft 10 being rotatably mounted relative to the casing 31 about the longitudinal axis X. The high-pressure shaft 10 is coaxial with the low-pressure shaft 11 and extends about the low-pressure shaft 11.

When the propulsion system 1 is in operation, the rotor 71 of the high-pressure turbine 7 drives in rotation the rotor 51 of the low-pressure compressor 5 via the low-pressure shaft 11.

The high-pressure turbine 7, the high-pressure shaft 10 and the high-pressure compressor 4 together form the "high-pressure spool" of the propulsion system 1.

The low-pressure shaft 11 and the high-pressure shaft 10 can be co-rotating, that is to say driven in the same direction of rotation about the longitudinal axis X. As a variant, the low-pressure shaft 11 and the high-pressure shaft 10 can be counter-rotating, that is to say driven in opposite directions of rotation about the longitudinal axis X.

The two-spool propulsion system 1 can in particular comprise a single-stage high-pressure turbine 7 that is to say comprising exactly one stage, or a two-stage high-pressure turbine 7 that is to say comprising exactly two stages (as illustrated in the example of FIG. 2).

The high-pressure compressor 5 comprises at least eight stages (as illustrated in the example of FIG. 2) and at most eleven stages.

The low-pressure turbine 8 comprises at least three stages (as illustrated in the example of FIG. 2) and at most seven stages.

The low-pressure compressor 4 comprises at least two stages and at most four stages.

When the propulsion system is in operation, an air stream F entering the propulsion system 1 passes through the fan 22 then is divided between a primary air stream F1 and a secondary air stream F2, which circulate from upstream to downstream in the propulsion system 1.

The secondary air stream F2, also called "bypass air stream", flows in the secondary flowpath, around the primary spool 3. The secondary air stream F2 makes it possible to cool the periphery of the primary spool 3 and serves to generate most of the thrust provided by the propulsion system 1.

The primary air stream F1 flows in a primary flowpath 29 inside the primary spool 3, passing successively through the compressor section 29 (low-pressure compressor 4 and high-pressure compressor 5), the combustion chamber 6 where it is mixed with fuel to serve as an oxidizer, and the turbine section 30 (high-pressure turbine 7 and low-pressure turbine 8). The passage of the primary air stream F1 through the turbine section 30 receiving energy from the combustion chamber 6 causes a rotation of the movable wheels 7a, 8a of the turbine section 30, which in turn drive in rotation the movable wheels 4a, 5a of the compressor section 29 as well as the fan rotor 9.

In order to improve the propulsive efficiency of the propulsion system 1 and to reduce its specific consumption as well as the noise emitted by the fan section 2, the propulsion system 1 has a high bypass ratio. By "high" bypass ratio it is meant a bypass ratio greater than or equal to 10, for example comprised between 10 and 80 inclusive, preferably comprised between 10 and 35 inclusive, preferably between 10 and 18 inclusive. The bypass ratio is defined as a ratio between the mass flow rate of the secondary air stream F2 and the mass flow rate of the primary air stream F1, these mass flow rates being measured when the propulsion system 1 is stationary, not installed, in take-off regime in a standard atmosphere (as defined by the International Civil Aviation Organization (ICAO) manual, Doc 7488/3, 3rd edition) and at sea level. By "not installed", it is meant that the measurements are performed when the propulsion system 1 is on a test bench (and not installed on an aircraft), the measurements then being simpler to carry out.

In a propulsion system including a reduction mechanism 19 such as the one illustrated in FIG. 2, the decoupling between the rotation speed of the fan 22 and the rotation speed of the low-pressure turbine 8 makes it possible to reduce the rotation speed and the pressure ratio of the fan rotor 9 while increasing the power extracted by the low-pressure turbine 8. Indeed, the overall efficiency of the propulsion system 1 is conditioned to the first order by the propulsive efficiency, which is favorably influenced by minimization of the variation in the kinetic energy of the air when crossing the propulsion system 1. In a propulsion system with a high bypass ratio, most of the flow rate generating the propulsive force is made up of the secondary air stream F2 of the propulsion system 1, the kinetic energy of the secondary air stream F2 being mainly affected by the compression that the secondary air stream F2 undergoes when crossing the fan section 2. The propulsive efficiency and the pressure ratio of the fan section 2 are therefore linked: the lower the pressure ratio of the fan section 2, the better the propulsive efficiency will be. In order to improve the propulsive efficiency of the propulsion system 1, the fan pressure ratio, which corresponds to the ratio between the average pressure at the outlet of the fan stator 16 (or, in the absence of a stator 16, at the outlet of the fan rotor 9) and the average pressure at the inlet of the fan rotor 9 is less than or equal to 1.70, preferably less than or equal to 1.50, for example comprised between 0.90 and 1.45. The average pressures are measured here over the height of at least one of the fan blades 14 that is to say of the surface which delimits radially inside the air flowpath at the inlet of the fan rotor 9 at the top 21 of the fan blade 14.

The peripheral speed at the top 21 of the fan blades 14 can also be comprised between 260 meters per second ($m \cdot s^{-1}$) and 400 meters per second ($m \cdot s^{-1}$) inclusive. The fan pressure ratio can then be comprised between 1.20 and 1.45.

In a direct-drive propulsion system, the fan rotor 9 can alternatively be directly coupled to the low-pressure shaft 11 that is to say without a reduction mechanism. The low-pressure shaft 11 then coincides with the fan shaft 20 so that the fan rotor 9 is driven by the low-pressure shaft 11 at the same speed of rotation as the rotor 81 of the low-pressure turbine 8.

The propulsion system 1 is configured to provide a thrust comprised between 18,000 lbf (80,068 N) and 51,000 lbf (226,859 N), preferably between 20,000 lbf (88,964 N) and 35,000 lbf (155,688 N).

The diameter D of the fan rotor 9 can be comprised between 80 inches (203.2 cm) and 185 inches (469.9 cm) inclusive. When the fan rotor 9 is ducted, the diameter D is preferably comprised between 85 inches (215.9 cm) and 120 inches (304.8 cm) inclusive, for example of the order of 90 inches (228.6 cm), which allows the integration of the propulsion system 1 in a conventional manner, particularly under a wing of the aircraft 1.

FIG. 3 schematically represents a partial and sectional view of a second example of the propulsion system 1.

In FIG. 3, the components identical or similar to those of the propulsion system of FIG. 2 are designated by identical references.

In the example illustrated in FIG. 3, the propulsion system 1 is a two-spool unducted fan gas turbine engine. It can be a gas turbine engine of the Open Rotor or Unducted Single Fan type.

Unlike the first example in FIG. 2, the fan rotor 9, which can also be designated by the term "propeller", is not surrounded by a fan casing.

The fan section 2 being unducted, the fan blades 14 have a variable setting.

Alternatively, the propulsion system 1 could comprise two unducted and counter-rotating fan rotors 9. Such a propulsion system 1 is known under the acronym "CROR" for Contra-Rotating Open Rotor or "UDF" for Unducted Double Fan. The fan rotors 9 can be placed at the rear of the primary spool 3 so as to be of the pusher type or at the front of the primary spool 3 so as to be of the puller type.

The absence of fairing around the fan rotor 9 makes it possible to increase the bypass ratio significantly without the propulsion system 1 being penalized by the mass of the casings 12 or nacelles intended to surround the fan section 2. The bypass ratio of the propulsion system 1 comprising an unducted fan section 2 is thus greater than or equal to 40, for example comprised between 40 and 80 inclusive. The peripheral speed at the end 21 of the fan blades 14 of the fan rotor(s) 9 can also be comprised between 210 meters per second (m·s$^{-1}$) and 260 meters per second (m·s$^{-1}$) inclusive. The fan pressure ratio can then be comprised preferably between 0.90 and 1.20 inclusive.

The diameter D of the fan rotor 9 can be comprised between 80 inches (203.2 cm) and 185 inches (469.9 cm) inclusive. When the rotor 9 is unducted, the diameter D is preferably greater than or equal to 100 inches (254 cm), for example between 120 inches (304.8 cm) and 156 inches (396.2 cm). The diameter of the fan rotor 9 is measured here in a plane normal to the longitudinal axis X, which is the axis of rotation of the fan rotor 9, at an intersection between an end 21 and a leading edge 22 of the fan blades 14.

It should be noted that, since FIG. 2 and FIG. 3 are partial views, the diameter D is only partially visible.

The reduction mechanism 19 can comprise a planetary gear or star gear, single-stage or two-stage reduction mechanism.

For example, FIG. 4 illustrates a reduction mechanism 19 of the star gear type. The reduction mechanism 19 comprises a sun pinion 19a (inlet of the reduction mechanism 19), centered on an axis of rotation of the reduction mechanism 19 generally coincident with the longitudinal axis X and configured to be driven in rotation by the low-pressure shaft 11, a ring gear 19b (outlet of the reduction mechanism 19) coaxial with the sun pinion 19a and configured to drive in rotation the fan shaft 20 about its axis of rotation X, and a series of planet gears 19c distributed circumferentially about the axis of rotation X of the rotor 9 of the fan section 2, between the sun pinion 19a and the ring gear 19b, each planet gear 19c being meshed internally with the sun pinion 19a and externally with the ring gear 19b. The series of planet gears 19c is mounted on a planet gear carrier 19d which is stationary relative to a stator part 19e of the propulsion system 1, for example relative to a casing of the compressor section 4, 5.

In another example, FIG. 5 illustrates a reduction mechanism 19 of the planetary gear type, in which case the ring gear 19b is fixedly mounted on the stator part 19e of the propulsion system 1 and the fan shaft 20 is driven in rotation by the planet gear carrier 19d.

Whatever the configuration of the reduction mechanism 19, the diameter of the ring gear 19b and of the planet gear carrier 19d are greater than the diameter of the sun pinion 19a, so that the rotation speed of the rotor 9 of the fan section 2 is lower than the rotation speed of the low-pressure shaft 11.

The reduction ratio of the reduction mechanism 19 is greater than or equal to 2.5 and less than or equal to 11. In the case of a ducted fan propulsion system 1, the reduction ratio can be greater than or equal to 2.7 and less than or equal to 3.5, typically around 3.0. In the case of an unducted fan propulsion system 1, the reduction ratio can be comprised between 9.0 and 11.0.

FIG. 6 schematically represents a movable wheel 8a forming part of a rotor 81 of a low-pressure turbine 8 of a propulsion system 1.

The movable wheel 8a comprises a turbine movable disk 32 centered on the longitudinal axis X, and a plurality of turbine blades 33 fixed to the turbine movable disk 32 and extending radially from the turbine movable disk 32.

The movable wheel 8a comprises a number Z of turbine blades 32. The number Z of turbine blades 32 can be comprised between 30 and 180 inclusive, preferably comprised between 70 and 100 inclusive.

FIG. 7 schematically represents a turbine movable disk 32. The turbine movable disk 32 comprises a hub 321, a rim 322, and a web 323 connecting the hub 321 to the rim 322. The hub 321 has a radially inner surface 324 which delimits a central bore 325 of cylindrical shape of revolution, having the longitudinal axis X as an axis of revolution. The hub 321 has a thickness (measured parallel to the longitudinal axis X) greater than the thickness of the web 323, in order to allow the movable wheel 8a to resist the centrifugal forces which are transmitted by the turbine blades 33.

Moreover, the turbine movable disk 32 comprises a radially outer surface 326, and a plurality of slots 327 extending from the radially outer surface 326, each slot 327 being delimited by a slot bottom surface 328. The slots 327 are distributed about the longitudinal axis X, with a constant angular deviation between two consecutive slots. Each slot 327 is provided to house a root of a turbine blade 33 in order to attach the turbine blade 33 to the turbine movable disk 32.

In this regard, each slot 327 has a shape adapted to allow axial insertion of a blade root while ensuring radial blocking of the blade root in the slot 327. Each slot 327 can have a dovetail or fir tree shape (as visible for example in FIG. 7), with at least one, or even several, lobe(s).

The movable disk 32 has a rim radius Rj and a rim thickness Lj.

The rim radius Rj is defined as the smallest radial distance between the longitudinal axis X and the slot bottom surface 328. The rim radius Rj can be comprised between 0.05 meters and 0.5 meters inclusive, preferably between 0.2 and 0.3 meters inclusive.

The rim thickness Lj is defined as an axial distance between, on the one hand, a corner point (point A in FIG. 7) of an upstream surface 329 of the turbine movable disk 32 and the slot bottom surface 328 and, on the other hand, a corner point (point B in FIG. 7) of the downstream surface 330 of the turbine movable disk 32 and the slot bottom surface. The rim thickness Lj can be comprised between 0.01 meters and 0.06 meters inclusive.

FIGS. 8A and 8B schematically represent a turbine blade 33. The turbine blade 33 comprises a root 332, an aerodynamically profiled airfoil 333 and a shroud 334.

The root 332 comprises an attachment portion 331 capable of being inserted into a slot 327 of the turbine movable disk 32, in order to fix the turbine blade 33 on the turbine movable disk 32. For this purpose, the attachment portion 331 has a complementary shape to a slot 327 of the turbine movable disk 32.

The root 332 further comprises a stilt connecting the attachment portion 331 to the aerodynamically profiled airfoil 333. The stilt comprises a platform 335 having a radially outer surface 336.

The aerodynamically profiled airfoil 333 extends from the root 332 to the shroud 334. The aerodynamically profiled airfoil 333 has a leading edge 341, a trailing edge 342, an intrados surface 343 and an extrados surface 344.

The shroud 334 has a radially inner surface 338 and a radially outer surface 339.

When several turbine blades 33 are fixed to the turbine movable disk 32, the radially outer surfaces 336 of the platforms 335 and the radially inner surfaces 338 of the shrouds 334 radially delimit a gas circulation flowpath through the turbine, while the gas stream flows between the aerodynamically profiled airfoils 333.

As illustrated in FIG. 9, the gas circulation flowpath thus has an inner flowpath radius Ri and an outer flowpath radius Re.

The inner flowpath radius Ri is defined as an average between, on the one hand, a distance between the longitudinal axis X and a corner point (point C in FIG. 9) between the radially outer surface 336 of the platform 335 and the leading edge 341 of the aerodynamically profiled airfoil 333 and, on the other hand, a distance between the longitudinal axis X and a corner point (point D in FIG. 9) between the radially outer surface 336 of the platform 335 and the trailing edge 342 of the aerodynamically profiled airfoil 333. The inner flowpath radius Ri can be comprised between 0.1 and 0.8 meters inclusive, depending on the stage of the turbine to which the movable wheel 8a belongs, preferably comprised between 0.25 and 0.35 meters inclusive.

The outer flowpath radius Re is defined as an average between, on the one hand, a distance between the longitudinal axis X and a corner point (point E in FIG. 9) between the radially inner surface 338 of the shroud 334 and the leading edge 341 and, on the other hand, a distance between the longitudinal axis X and a corner point (point F in FIG. 9) between the radially inner surface 338 of the shroud 334 and the trailing edge 342. The outer flowpath radius Re can be comprised between 0.15 and 1.0 meters inclusive, depending on the stage of the turbine to which the movable wheel 8a belongs, preferably comprised between 0.35 and 0.55 meters inclusive.

An average flowpath radius Rm is defined as an average of the outer flowpath radius Re and of the inner flowpath radius Ri. The average flowpath radius Rm is comprised between 0.125 meters and 0.9 meters inclusive, preferably between 0.3 and 0.45 meters inclusive.

A flowpath height H is defined as a difference between the outer flowpath radius Re and the inner flowpath radius Ri. The flowpath height H can be comprised between 0.01 meters and 0.9 meters inclusive, preferably between 0.05 and 0.25 meters inclusive.

The turbine blade has a blade tip chord length $Cx_{tip}$ and a blade root chord length $Cx_{root}$.

The blade root chord length $Cx_{root}$ is defined as an axial distance between, on the one hand, the corner point (point C in FIG. 9) between the radially outer surface 336 of the platform 335 and the leading edge 341 of the aerodynamically profiled airfoil 333 and, on the other hand, the corner point (point D in FIG. 9) between the radially outer surface 336 of the platform 335 and the trailing edge 342 of the aerodynamically profiled airfoil 333. The blade root chord length $Cx_{root}$ is comprised between 0.01 meters and 0.05 meters inclusive, preferably between 0.02 and 0.04 meters inclusive.

The blade tip chord length $Cx_{tip}$ is defined as an axial distance between, on the one hand, the corner point (point E in FIG. 9) between the radially inner surface 338 of the shroud 334 and the leading edge 341 of the aerodynamically profiled airfoil 333 and, on the other hand, the corner point (point F in FIG. 9) between the radially inner surface 338 of the shroud 334 and the trailing edge 342 of the aerodynamically profiled airfoil 333. The blade tip chord length $Cx_{tip}$ is comprised between 0.005 meters and 0.05 meters inclusive, preferably between 0.015 and 0.03 meters inclusive.

By "axial distance", it is meant a distance measured parallel to the longitudinal axis X. In other words, the axial distance between point C and point D is the distance between a first plane orthogonal to the longitudinal axis X passing through point C, and a second plane orthogonal to the longitudinal axis X passing through point D. Likewise, the axial distance between point E and point F is the distance between a third plane orthogonal to the longitudinal axis X passing through point E, and a fourth plane orthogonal to the longitudinal axis X passing through point F.

As illustrated in FIG. 8A and FIG. 8B, the radially outer surface 339 of the shroud 334 can be provided with lips 337 extending radially from the radially outer surface 339, in order to ensure a sealing with a turbine casing.

In addition, the shroud 334 can have notches in order to reduce the mass of the shroud 334 and thus limit the centrifugal forces exerted on the turbine blade 33.

The turbine blade 33 can be formed in a single piece of material, for example metal.

In one embodiment, the shroud 334 is formed of a material, and has a difficulty σ defined as:

$$\sigma = \rho \times \frac{\pi^2}{4} \times \frac{Re^3}{Z^2} \times \left(\frac{\pi w}{30}\right)^2$$

where:
ρ is a density of the shroud material in kilograms per cubic meter (kg/m³),
Re is the outer flowpath radius, in meters (m),
Z is a number of blades of the movable wheel,
w is a limit rotation speed of the low-pressure shaft, in revolutions per minute (rpm).

The difficulty σ represents a constraint of connection of the shroud 334 to the aerodynamically profiled airfoil 333. More specifically, the difficulty σ is equivalent to a mechanical constraint located at the location of the connecting radius between the shroud 334 and the aerodynamically profiled airfoil 333.

The density of the material of the shroud 334 (which can be formed into a single piece of material with the rest of the turbine blade) can be comprised between 2,000 kg/m³ and 10,000 kg/m³, depending on the material chosen, preferably comprised between 7,500 kg/m³ and 9,000 kg/m³.

The limit rotation speed w (or redline speed) of the low-pressure shaft is the rotation speed of the low-pressure shaft when the aeronautical propulsion system operates at maximum constant power or maximum stabilized power (Maximum Continuous Power), according to the European certification regulation EASA CS-E 740 (or according to the American certification regulation 14-CFR Part 33).

The limit rotation speed w corresponds to the absolute maximum speed likely to be encountered by the low-pressure shaft 11. The limit rotation speed w can be comprised between 2,000 revolutions per minute (209 radians per second) and 30,000 revolutions per minute (3,142 radians per second) inclusive, for example between 8,500 revolutions per minute (890 radians per second) and 12,000 revolutions per minute (1,267 radians per second) inclusive, preferably between 9,000 revolutions per minute (942 radians per second) and 11,000 revolutions per minute (1,152 radians per second) inclusive. This speed limit forms part of the data declared in the certification manual of the propulsion system (or type certificate data sheet). Indeed, this rotation speed is usually used as a reference speed for the dimensioning of the components of the propulsion systems and in the certification tests, such as blade loss or rotor integrity tests.

Of course, the high-pressure shaft 10 also has a limit speed, defined in the same way as for the low-pressure shaft 11, but greater than that of the low-pressure shaft 11.

The limit rotation speed of the high-pressure shaft 10 can be comprised between 8,000 revolutions per minute (838 radians per second) and 30,000 revolutions per minute (3,142 radians per second) inclusive, preferably between 15,000 revolutions per minute (1,571 radians per second) and 25,000 revolutions per minute (2,618 radians per second) inclusive.

The turbine blade 33 has a temperature T measured when the low-pressure shaft 11 rotates at the limit rotation speed w.

The temperature T can be determined by considering that:
the first stage of the low-pressure turbine 8, in the gas flow direction, is subjected to the temperature of the exhaust gases (Exhaust Gas Temperature or EGT) when the low-pressure shaft 11 turns at the limit rotation speed w,
the temperature of the last stage of the low-pressure turbine 8, in the gas flow direction, is 0.7 times the temperature of the first stage, namely 0.7 times the EGT temperature, and
the temperature evolves linearly through the stages from the temperature of the first stage (equal to the EGT temperature) to the temperature of the last stage (equal to 0.7 times the EGT temperature).

The exhaust gas temperature (or EGT temperature) is the temperature of the exhaust gases at the outlet of the low-pressure turbine 8 when the aeronautical propulsion system operates at maximum constant power or maximum stabilized power (Maximum Continuous Power), according to the European certification regulation EASA CS-E 740 (or according to the American certification regulation 14-CFR Part 33). The EGT temperature forms part of the data declared in the certification manual of the aeronautical propulsion system (or type certificate data sheet). It is the maximum permissible prescribed turbine temperature (Maximum permissible Indicated Turbine Temperature or ITT) at maximum constant power or maximum stabilized power (Maximum Continuous Power). The EGT temperature can be measured in the motor plan No. 49.

Thus, for a low-pressure turbine 8 having N stages, the temperature T of a blade of the $i^{th}$ stage is:

$$\tau = EGT - (i-1)\Delta T$$
$$\Delta T = \frac{0.3 \times EGT}{N-1}$$

where $\Delta T$ is the temperature variation between two consecutive stages, and EGT is the EGT temperature of the aeronautical propulsion system.

The density $\rho$ of the shroud 334, the outer flowpath radius Re and the number of turbine blades Z are chosen such that:
if the temperature T is lower than 759° C. (1,032 K): $\sigma > 25 \times 10^4$,
if the temperature T is in the range from 759° C. (1,032 K) to 1,083° C. (1,356 K): $\sigma > a \times T + b$, where $a = -524.69$, $b = 6.4823971 \times 10^5$, T being in degrees Celsius (° C.),
if the temperature T is in the range from 1,083° C. (1,356 K) to 1,117° C. (1,390 K): $\sigma > c \times T + d$, where $c = -3846.2$, $d = 4.24543504 \times 10^6$, and T being in degrees Celsius (° C.), and
if the temperature T is greater than 1,117° C. (1,390 K): $\sigma > 0$.

FIG. 10 schematically represents the difficulty limit thus defined.

This design of the turbine blade 33 provides a compromise between increased performance of the low-pressure turbine 8 and mechanical strength of the turbine blade 33.

By dimensioning the turbine blade 33 so as to obtain a difficulty $\sigma$ above the design limit, it is possible to improve the performance of the turbine while guaranteeing the mechanical strength of the shroud 334 of the blade. This is made possible thanks to a particular design of the shroud 334 (three-dimensional shape, choice of thicknesses, mass) as well as a selection of the material of the shroud 334.

Preferably, the density $\rho$ of the shroud 334, the outer flowpath radius Re and the number of turbine blades Z are chosen such that:
if the temperature T is lower than 759° C. (1,032 K): $\sigma > 37 \times 10^4$,
for a temperature T ranging from 759° C. (1,032 K) to 1,083° C. (1,356 K): $\sigma > a \times T + b$, where $a = -524.69$, $b = 7.68241 \times 10^5$, T being in degrees Celsius (° C.),
for a temperature T ranging from 1,083° C. (1,356 K) to 1,135° C. (1,408 K): $\sigma > c \times T + d$, where $c = -3846.2$, $d = 4.365370 \times 10^6$, T being in degrees Celsius (° C.), and
for a temperature T greater than 1,135° C. (1,408 K): $\sigma > 0$.

Preferably, the density $\rho$ of the shroud 334, the outer flowpath radius Re and the number of turbine blades Z are chosen such that $\sigma < 5 \times 10^5$.

In one embodiment, a parameter N2S is defined as:

$$N2S = \pi(Re^2 - Ri^2) \times w^2$$

where:
Re is the outer flowpath radius in meters (m),
Ri is the inner flowpath radius in meters (m),
w is the limit rotation speed of the low-pressure shaft defined previously, in revolutions per minute (rpm).

The parameter N2S is always positive, given its definition.

The parameter N2S (also noted "$AN^2$") is representative of the intensity of the mechanical loads due to the centrifugal forces exerted on the aerodynamically profiled airfoil 333. These mechanical loads are supported by the aerodynamically profiled airfoil 333 itself as well as by the turbine movable disk 32.

The turbine blade 33 has a temperature T measured when the drive shaft rotates at the limit rotation speed w.

The outer flowpath radius Re and the inner flowpath radius Ri are chosen such that:
if the temperature T is lower than or equal to 700° C. (973 K): $N2S > 33.7 \times 10^6$ rpm$^2$·m$^2$,
if the temperature T is greater than 700° C. (973 K): $N2S > a \times T + b$, where $a = -0.055$ and $b = 72.2$, T being in degrees Celsius (° C.) and N2S being in $10^6$ rpm$^2$·m$^2$.

FIG. 11 schematically represents the thus defined limit of N2S.

This design of the turbine blade 33 provides a compromise between increased performance of the low-pressure turbine 8 and mechanical strength of the turbine blade 33.

By dimensioning the turbine blade 33 so as to obtain a parameter N2S above the associated design limit, it is possible to improve the performance of the turbine while guaranteeing the mechanical strength of the aerodynamically profiled airfoil 333 of the blade. This is made possible thanks to a particular design of the shroud 334 and of the aerodynamically profiled airfoil 333 (three-dimensional shape, choice of the thicknesses, mass) as well as a selection of the material of the shroud 334 and of the aerodynamically profiled airfoil 333.

Preferably, the outer flowpath radius Re and the inner flowpath radius Ri are chosen such that:
- if the temperature T is lower than or equal to 700° C. (973 K): N2S>44×10⁶ rpm²·m²,
- if the temperature T is greater than 700° C. (973 K): N2S>a×T+b, where a=−0.055 and b=82.5, T being in degrees Celsius (° C.) and N2S being in 10⁶ rpm²·m².

Preferably, the outer flowpath radius Re and the inner flowpath radius Ri are chosen such that N2S<60×10⁶ rpm²·m².

In one embodiment, a parameter $$\frac{F}{SL}$$

is defined as:

$$\frac{F}{sL} = N2S \times Rm \times H \times Z \times \frac{\pi^2 w^2}{900 \times Rj \times Lj}$$

with:

$$N2S = \pi(Re^2 - Ri^2) \times w^2$$

and:

$$Rm = \frac{Re + Ri}{2}$$

where:
Re is the outer flowpath radius, in meters (m),
Ri is the inner flowpath radius, in meters (m),
Rm is the average flowpath radius, in meters (m),
H is the height of the flowpath, in meters (m),
Z is the number of blades,
w is the limit rotation speed of the low-pressure shaft defined previously, in revolutions per minute (rpm),
Rj is the rim radius, in meters (m),
Lj is the rim thickness, in meters (m).

The parameter $$\frac{F}{sL}$$

is always positive, given its definition.

The parameter $$\frac{F}{sL}$$

is representative of a difficulty in the attachment between the turbine blade 33 and the turbine movable disk 32.

The turbine blade 33 has a temperature T measured when the low-pressure shaft 10 rotates at the limit rotation speed w.

The outer flowpath radius Re, the inner flowpath radius Ri, the rim radius Rj, the rim thickness Lj and the number of turbine blades Z are chosen such that:

$$\frac{F}{sL} > a \times T + b$$

where a=−0.6976 and b=694.65, T being in degrees Celsius (° C.), N2S being in 10⁶ rpm²·m² and $$\frac{F}{sL}$$

being in 10⁸ Newtons per cubic meter (10⁸ N/m³).

FIG. 12 schematically represents the thus defined difficulty limit.

Preferably, the outer flowpath radius Re, the inner flowpath radius Ri, the rim radius Rj, the rim thickness Lj and the number of turbine blades Z are chosen such that:

$$\frac{F}{sL} > a \times T + b$$

where a=−0.6976 and b=844.65, T being in degrees Celsius (° C.), N2S being in 10⁶ rpm²·m² and $$\frac{F}{sL}$$

being in 10⁸ Newtons per cubic meter (10⁸ N/m³).

Preferably, the outer flowpath radius Re, the inner flowpath radius Ri, the rim radius Rj, the rim thickness Lj and the number of turbine blades Z are chosen such that $$\frac{F}{sL} < 700.$$

In one embodiment, the outer flowpath radius Re and the inner flowpath radius Ri are chosen such that:

$$\frac{Ri}{Re} > a \times N2S + b$$

with:

$$N2S = \pi(Re^2 - Ri^2) \times w^2$$

where:
w is a limit rotation speed of the low-pressure shaft defined previously, in revolutions per minute (rpm),
a=−0.0057, and
b=0.7561,
N2S being at $10^6$ rpm$^2$·m$^2$.

FIG. 13 schematically represents the limit of the ratio $$\frac{Ri}{Re}$$

thus defined.

This design of the turbine blade 33 provides a compromise between increased performance of the low-pressure turbine 8 and mechanical strength of the turbine blade 33.

By dimensioning the turbine blade 33 so as to obtain a ratio $$\frac{Ri}{Re}$$

above the associated design limit, it is possible to improve the performance of the turbine while guaranteeing the mechanical strength of the turbine blade 33. This is made possible thanks to a particular design of the shroud 334, of the aerodynamically profiled airfoil 333 and of the root 332 (three-dimensional shape, choice of the thicknesses, mass) as well as a selection of the material of the shroud 334, of the aerodynamically profiled airfoil 333 and of the root 332.

Preferably, the outer flowpath radius Re and the inner flowpath radius Ri are chosen such that:

$$\frac{Ri}{Re} > a \times N2S + b$$

where a=−0.0057, and b=0.8561, N2S being in $10^6$ rpm$^2$·m$^2$.

The ratio $$\frac{Ri}{Re}$$

is positive, given its definition, and less than 1, because the outer flowpath radius Re is greater than the inner flowpath radius Ri.

In one embodiment, the aerodynamically profiled airfoil 333 is dimensioned, that is to say, in particular, the blade tip chord length $Cx_{tip}$, the blade root chord length $Cx_{root}$, the outer flowpath radius Re and the inner flowpath radius Ri are chosen, such that:
if $$N2S < 15: 0.2 < \frac{Cx_{tip}}{Cx_{root}} < a \times N2S + b,$$

where a=−0.0267 and b=1.15, and
if $$N2S \geq 15: \frac{Cx_{tip}}{Cx_{root}} \in [0.2; 0.75],$$

N2S being in $10^6$ rpm$^2$·m$^2$.

As mentioned previously, the parameter N2S is representative of the intensity of the mechanical loads due to the centrifugal forces exerted on the aerodynamically profiled airfoil 333.

The ratio between the blade tip chord and the blade root chord $$\frac{Cx_{tip}}{Cx_{root}}$$

is representative of the tapered shape of the aerodynamically profiled airfoil 333. Thus, the tapered shape of the aerodynamically profiled airfoil 333 is defined as a function of the mechanical loads due to the centrifugal forces exerted on the aerodynamically profiled airfoil 333.

The tapered shape of the aerodynamically profiled airfoil 333 makes it possible to lighten the shroud 334 and consequently limit the mechanical stresses exerted on the aerodynamically profiled airfoil 333, on the root 332 and on the turbine movable disk 32.

FIG. 14 schematically represents the limits of the ratio $$\frac{Cx_{tip}}{Cx_{root}}$$

thus defined, as a function of the parameter N2S.

By dimensioning the turbine blade 33 so as to obtain a ratio $$\frac{Cx_{tip}}{Cx_{root}}$$

within the associated design limits, it is possible to reduce the mass of the shroud 334 and therefore limit the stresses transmitted by the shroud 334 to the aerodynamically profiled airfoil 333 and to the attachment part 331 of the root 332, and consequently to allow greater freedom for the dimensioning of the blade, which makes it possible to improve the performance of the low-pressure turbine 8.

Preferably, the aerodynamically profiled airfoil 333 is dimensioned, that is to say, in particular, the blade tip chord length $Cx_{tip}$, the blade root chord length $Cx_{root}$, the outer flowpath radius Re and the inner flowpath radius Ri are chosen, such that:
if $$N2S < 15: 0.2 < \frac{Cx_{tip}}{Cx_{root}} < a \times N2S + b,$$

where a=−0.0267 and b=1, and
if $$N2S \geq 15: \frac{Cx_{tip}}{Cx_{root}} \in [0.2; 0.6],$$

N2S being in $10^6$ rpm$^2$·m$^2$.

Unless otherwise indicated, the distances, or dimensions (length, width, radius, diameter, etc.) mentioned in the preceding description, are measured at ambient temperature (approximately 20° C.) when the propulsion system 1 is cold, that is to say when the propulsion system 1 is stopped for a sufficient period in order for the parts of the propulsion system 1 to be at ambient temperature, it being understood that these dimensions vary little compared to the conditions in which the propulsion system 1 would be in takeoff mode.

EXAMPLE

For a geared two-spool turbofan gas turbine engine comprising a low-pressure turbine having 3 stages, The 1$^{st}$ stage wheel of the low-pressure turbine was designed with the following parameters:

| | | | |
|---|---|---|---|
| Limit speed of the low-pressure shaft | w | 10,000 | rpm |
| Number of blades of the movable turbine wheel | Z | 90 | |
| Temperature of the blades at the limit rotation speed | T | 1,100 | ° C. |
| Rim radius | Rj | 0.28 | m |
| Rim thickness | Lj | 0.02 | m |
| Density of the material of the shroud | ρ | 8,500 | kg/m$^3$ |
| Outer flowpath radius | Re | 0.37 | m |
| Inner flowpath radius | Ri | 0.27 | m |
| Average flowpath radius | Rm | 0.32 | m |
| Flowpath height | H | 0.1 | m |
| Blade tip chord length | Cx$_{tip}$ | 0.02 | m |
| Blade root chord Length | Cx$_{root}$ | 0.035 | m |
| Difficulty of the shroud of the turbine blade | σ | 14.4 × 10$^4$ | |
| Parameter N2S | N2S | 20.1 | 10$^6$ rpm$^2$ · m$^2$ |
| Difficulty of the attachment between a turbine blade and a turbine movable disk | $\frac{F}{SL}$ | 113.4 | 10$^8$ N/m$^3$ |
| Ratio between the inner flowpath radius and the outer flowpath radius | $\frac{Ri}{Re}$ | 0.73 | |
| Ratio between the blade tip chord and the blade root chord | $\frac{Cx_{tip}}{Cx_{root}}$ | 0.57 | |

The invention claimed is:

1. A blade comprising:
   a root configured to be mounted in a slot of a plurality of slots which open out at an outer periphery of a rotor disk of a movable wheel of a low-pressure turbine of an aeronautical propulsion system, the rotor disk being centered on a longitudinal axis and the plurality of slots being circumferentially distributed about the longitudinal axis, the rotor disk having an upstream surface and a downstream surface, each slot of the plurality of slots being delimited by a bottom surface, the rotor disk comprising a plurality of blades circumferentially distributed at the outer periphery of the rotor disk, each blade of the plurality of blades being mounted among the plurality of slots, the root comprising a first platform which has a radially outer surface;
   a shroud comprising a second platform which has a radially inner surface; and
   an airfoil extending from the root to the shroud, the airfoil having a leading edge and a trailing edge;
   wherein a parameter N2S is defined as N2S=π(Re$^2$−Ri$^2$)× w$^2$, wherein:
   Re is an outer flowpath radius defined as an average of a first radial distance and of a second radial distance, the first radial distance being a distance between the longitudinal axis and a first corner point between the radially inner surface of the second platform and the leading edge, and the second radial distance being a distance between the longitudinal axis and a second corner point between the radially inner surface of the second platform and the trailing edge, the outer flowpath radius Re being in meters;
   Ri is an inner flowpath radius defined as an average of a third radial distance and of a fourth radial distance, the third radial distance being a distance between the longitudinal axis and a third corner point between the radially outer surface of the first platform and the leading edge, and the fourth radial distance being a distance between the longitudinal axis and a fourth corner point between the radially outer surface of the first platform and the trailing edge, the inner flowpath radius Ri being in meters;
   w is a limit rotation speed intended to be reached by a drive shaft of the aeronautical propulsion system when the aeronautical propulsion system operates at maximum constant power, the movable wheel of the low-pressure turbine of the aeronautical propulsion system being configured to drive in rotation the drive shaft about the longitudinal axis, the limit rotation speed w being in revolutions per minute;
   wherein the blade is intended to be subjected to a temperature T when the drive shaft rotates at the limit rotation speed w;
   wherein a parameter $$\frac{F}{sL}$$

is defined as $$\frac{F}{sL} = N2S \times Rm \times H \times Z \times \frac{\pi^2 w^2}{900 \times Rj \times Lj},$$

wherein:
   RM is defined as $$Rm = \frac{Re + Ri}{2};$$

H is a flowpath height defined as a difference between the outer flowpath radius Re and the inner flowpath radius Ri, the flowpath height H being in meters;
   Z is the number of blades of the plurality of blades of the rotor disk;
   Rj is a rim radius defined as a smallest radial distance between the longitudinal axis and the bottom surface of each slot of the plurality of slots, the rim radius Rj being in meters;

Lj is a rim thickness defined as an axial distance between a fifth corner point between the upstream surface of the rotor disk and a bottom surface of each slot of the plurality of slots, and a sixth corner point between the downstream surface of the rotor disk and the bottom surface, the rim thickness Lj being in meters;

wherein the outer flowpath radius Re and the inner flowpath radius Ri are further chosen such that $$\frac{F}{sL} > c \times T + d,$$

wherein:
a=−0.6976;
b=694.65;
T is in degrees Celsius;
N2S is in $10^6$ rpm$^2 \cdot$m$^2$; and $$\frac{F}{sL}$$

is in $10^8$ Newtons per cubic meter; and
wherein the outer flowpath radius Re is comprised in a range from 0.15 to 1.0 meters and the inner flowpath radius Ri is comprised in a range from 0.1 to 0.8 meters.

2. The blade of claim 1, wherein the outer flowpath radius Re and the inner flowpath radius Ri are further chosen such that $$\frac{F}{sL} > c \times T + d,$$

wherein:
c=−0.6876:
d=844.65;
T is in degrees Celsius;
N2S is in $10^6$ rpm$^2 \cdot$m$^2$; and $$\frac{F}{sL}$$

is in $10^8$ Newtons per cubic meter.

3. The blade of claim 1, wherein the shroud is formed of a material and has a difficulty σ defined as $$\sigma = \rho \times \frac{\pi^2}{4} \times \frac{Re^3}{Z^2} \times \left(\frac{\pi w}{30}\right)^2,$$

wherein:
ρ is a density of the material in kilograms per cubic meter;
Z is the number of blades of the plurality of blades of the rotor disk;
wherein the density ρ and the outer flowpath radius Re are chosen such that:
  if the temperature T is lower than 759° C., then σ>25×$10^4$;
  if the temperature T is in the range from 759° C. to 1,083° C., then σ>c×T+d, wherein:
    c=−524.69;
    d=6.4823971×$10^5$; and
    T is in degrees Celsius;
  if the temperature T is in the range from 1,083° C. to 1,117° C., then σ>e×T+f, wherein:
    e=−3846.2;
    f=4.24543504×$10^6$; and
    T is in degrees Celsius; and
  if the temperature T is greater than 1,117° C., then σ>0; and
wherein the density of the material ρ is comprised in a range from 2,000 to 10,000 kilograms per cubic meter.

4. The blade of claim 3, wherein the density ρ and the outer flowpath radius Re are chosen such that:
  if the temperature T is lower than 759° C., then σ>37×$10^4$;
  if the temperature T is in the range from 759° C. to 1,083° C., then σ>g×T+h, wherein:
    g=−524.69;
    h=7.68241×$10^5$; and
    T is in degrees Celsius;
  if the temperature T is in the range from 1,083° C. to 1,135° C., then σ>i×T+j, wherein:
    i=−3846.2;
    j=4.365370×$10^6$; and
    T is in degrees Celsius; and
  if the temperature T is greater than 1,135° C., then σ>0.

5. The blade of claim 1, wherein the outer flowpath radius Re and the inner flowpath radius Ri are further chosen such that:
  if the temperature T is lower than or equal to 700° C., then N2S>33.7×$10^6$; and
  if the temperature T is greater than 700° C., then N2S>c×T+d, wherein:
    c=−0.055;
    d=72.2;
    T is in degrees Celsius; and
    N2S is in $10^6$ rpm$^2 \cdot$m$^2$.

6. The blade of claim 5, wherein the outer flowpath radius Re and the inner flowpath radius Ri are chosen such that:
  if the temperature T is lower than or equal to 700° C., then N2S>44×$10^6$; and
  if the temperature T is greater than 700° C., then N2S>e×T+f, wherein:
    e=−0.055;
    f=82.5;
    T is in degrees Celsius; and
    N2S is in $10^6$ rpm$^2 \cdot$m$^2$.

7. The blade of claim 1, wherein the outer flowpath radius Re and the inner flowpath radius Ri are further chosen such that $$\frac{Ri}{Re} > c \times N2S + d,$$

wherein:
c=−0.0057;
d=0.7561; and
N2S is in $10^6$ rpm$^{22} \cdot$m$^2$.

8. The blade of claim 7, wherein the outer flowpath radius Re and the inner flowpath radius Ri are further chosen such that $$\frac{Ri}{Re} > e \times N2S + f,$$

wherein:
 e=−0.0057;
 f=0.8561; and
 N2S is in $10^6$ rpm²·m².

9. The blade of claim 1, wherein:
 $Cx_{tip}$ is a blade tip chord length defined as an axial distance between the first corner point and the second corner point;
 $Cx_{root}$ is a blade root chord length defined as an axial distance between the third corner point and the fourth corner point;
wherein the blade tip chord length $Cx_{tip}$, the blade root chord length $Cx_{root}$, the outer flowpath radius Re and the inner flowpath radius Ri are chosen such that:
 if N2S<15, then $$0.2 < \frac{Cx_{tip}}{Cx_{root}} < c \times N2S + d,$$

wherein:
 c=−0.0267; and
 d=1.15;
 N2S is in $10^6$ rpm²·m²; and
if N2S≥15, then $$\frac{Cx_{tip}}{Cx_{root}} \in [0.2; 0.75],$$

N2S being in $10^6$ rpm².m²; and
wherein the blade tip chord length $Cx_{tip}$ is comprised in a range from 0.005 meters to 0.05 meters and the blade root chord length $Cx_{root}$ is comprised in a range from 0.01 meters to 0.05 meters.

10. The blade of claim 9, wherein the blade tip chord length $Cx_{tip}$, the blade root chord length $Cx_{root}$, the outer flowpath radius Re and the inner flowpath radius Ri are chosen such that:
 if N2S<15, then $$0.2 < \frac{Cx_{tip}}{Cx_{root}} < e \times N2S + f,$$

wherein:
 e=−0. 0267;
 f=1; and
 N2S is in $10^6$ rpm²·m²; and
if N2S≥15, then $$\frac{Cx_{tip}}{Cx_{root}} \in [0.2; 0.6],$$

N2S being in $10^6$ rpm²·m².

11. A movable wheel of a low-pressure turbine of an aeronautical propulsion system, the movable wheel comprising a rotor disk, at least one blade of the plurality of blades being the blade of claim 1, the root of each blade of the plurality of blades being mounted in a slot of the plurality of slots of the rotor disk, the movable wheel being configured to be driven in rotation by the drive shaft, Z being in a range from 30 to 180, the rim radius Rj being comprised in a range from 0.05 meters to 0.5 meters and the rim thickness Lj being comprised in a range from 0.01 meters to 0.06 meters.

12. An aeronautical propulsion system comprising the low-pressure turbine and the drive shaft, the low-pressure turbine comprising the movable wheel of claim 11, the drive shaft having the limit rotation speed w, the limit rotation speed w being comprised in a range from 2,000 to 30,000 revolutions per minute.

13. A method of dimensioning a blade comprising:
 a root configured to be mounted in a slot of a plurality of slots which open out at an outer periphery of a rotor disk of a movable wheel of a low-pressure turbine of an aeronautical propulsion system, the rotor disk being centered on a longitudinal axis and the plurality of slots being circumferentially distributed about the longitudinal axis, the rotor disk having an upstream surface and a downstream surface, each slot of the plurality of slots being delimited by a bottom surface, the rotor disk comprising a plurality of blades circumferentially distributed at the outer periphery of the rotor disk, each blade of the plurality of blades being mounted in among the plurality of slots, the root comprising a first platform which has a radially outer surface;
 a shroud comprising a second platform which has a radially inner surface; and
 an airfoil extending from the root to the shroud, the airfoil having a leading edge and a trailing edge;
wherein a parameter N2S is defined as N2S=$\pi(Re^2-Ri^2) \times w^2$, wherein:
 Re is an outer flowpath radius defined as an average of a first radial distance and of a second radial distance, the first radial distance being a distance between the longitudinal axis and a first corner point between the radially inner surface of the second platform and the leading edge, and the second radial distance being a distance between the longitudinal axis and a second corner point between the radially inner surface of the second platform and the trailing edge, the outer flowpath radius Re being in meters;
 Ri is an inner flowpath radius defined as an average of a third radial distance and of a fourth radial distance, the third radial distance being a distance between the longitudinal axis and a third corner point between the radially outer surface of the first platform and the leading edge, and the fourth radial distance being a distance between the longitudinal axis and a fourth corner point between the radially outer surface of the first platform and the trailing edge, the inner flowpath radius Ri being in meters;
 w is a limit rotation speed intended to be reached by a drive shaft of the aeronautical propulsion system when the aeronautical propulsion system operates at maximum constant power, the movable wheel of the low-pressure turbine of the aeronautical propulsion system being configured to drive in rotation the drive shaft about the longitudinal axis, the limit rotation speed w being in revolutions per minute;
wherein the blade is intended to be subjected to a temperature T when the drive shaft rotates at the limit rotation speed w;
wherein a parameter $$\frac{F}{sL}$$

is defined as $$\frac{F}{sL} = N2S \times Rm \times H \times Z \times \frac{\pi^2 w^2}{900 \times Rj \times Lj},$$

wherein:

Rm is defined as $$Rm = \frac{Re + Ri}{2};$$

H is a flowpath height defined as a difference between the outer flowpath radius Re and the inner flowpath radius Ri, the flowpath height H being in meters;

Z is the number of blades of the plurality of blades of the rotor disk;

Rj is a rim radius defined as a smallest radial distance between the longitudinal axis and the bottom surface of each slot of the plurality of slots, the rim radius Rj being in meters;

Lj is a rim thickness defined as an axial distance between a fifth corner point between the upstream surface of the rotor disk and a bottom surface of each slot of the plurality of slots, and a sixth corner point between the downstream surface of the rotor disk and the bottom surface, the rim thickness Lj being in meters;

the method comprising a step of dimensioning the blade during which the outer flowpath radius Re and the inner flowpath radius Ri are further chosen such that $$\frac{F}{sL} > a \times T + b,$$

wherein:

a=−0.6976;
b=694.65;
T is in degrees Celsius;
N2S is in $10^6$ rpm$^2\cdot$m$^2$; and $$\frac{F}{sL}$$

is in $10^8$ Newtons per cubic meter; and wherein the outer flowpath radius Re is comprised in a range from 0.15 to 1.0 meters and the inner flowpath radius Ri is comprised in a range from 0.1 to 0.8 meters.

14. The method of claim 13, wherein, during the step of dimensioning the blade, the outer flowpath radius Re and the inner flowpath radius Ri are further chosen such that $$\frac{F}{sL} > c \times T + d,$$

wherein:

c=−0.6976;
d=844.65;
T is in degrees Celsius;
N2S is in $10^6$ rpm$^2\cdot$m$^2$; and $$\frac{F}{sL}$$

is in $10^8$ Newtons per cubic meter.

15. The method of claim 13, wherein the shroud is formed of a material and has a difficulty σ defined as $$\sigma = \rho \times \frac{\pi^2}{4} \times \frac{Re^3}{Z^2} \times \left(\frac{\pi w}{30}\right)^2,$$

wherein:

ρ is a density of the material in kilograms per cubic meter;

Z is the number of blades of the plurality of blades of the rotor disk;

the method comprising a further step of dimensioning the blade during which the density ρ and the outer flowpath radius Re are chosen such that:

if the temperature T is lower than 759° C., then σ>25×$10^4$;

if the temperature T is in the range from 759° C. to 1,083° C., then σ>c×T+d, wherein:
c=−524.69;
d=6.4823971×$10^5$; and
T is in degrees Celsius;

if the temperature T is in the range from 1,083° C. to 1,117° C., then σ>e×T+f, wherein:
e=−3846.2;
f=4.24543504×$10^6$; and
T is in degrees Celsius; and if the temperature T is greater than 1,117° C., then σ>0; and wherein the density of the material ρ is comprised in a range from 2,000 to 10,000 kilograms per cubic meter.

16. The method of claim 15, wherein, during the further step of dimensioning the blade, the density ρ and the outer flowpath radius Re are chosen such that:

if the temperature T is lower than 759° C., then σ>37×$10^4$;

if the temperature T is in the range from 759° C. to 1,083° C., then σ>g×T+h, wherein:
g=−524.69;
h=7.68241×$10^5$; and
T is in degrees Celsius;

if the temperature T is in the range from 1,083° C. to 1,135° C., then σ>i×T+j, wherein:
i=−3846.2;
j=4.365370×$10^6$; and
T is in degrees Celsius; and if the temperature T is greater than 1,135° C., then σ>0.

17. The method of claim 13, wherein, during the step of dimensioning the blade, the outer flowpath radius Re and the inner flowpath radius Ri are further chosen such that:

if the temperature T is lower than or equal to 700° C., then N2S>33.7×$10^6$; and if the temperature T is greater than 700° C., then N2S>c×T+d, wherein:
c=−0.055;
d=72.2;
T is in degrees Celsius; and
N2S is in $10^6$ rpm$^2\cdot$m$^2$.

18. The method of claim 17, wherein, during the step of dimensioning the blade, the outer flowpath radius Re and the inner flowpath radius Ri are chosen such that:
if the temperature T is lower than or equal to 700° C., then $N2S > 44 \times 10^6$; and
if the temperature T is greater than 700° C., then $N2S > e \times T + f$, wherein:
e=−0.055;
f=82.5;
T is in degrees Celsius; and
N2S is in $10^6$ rpm$^2 \cdot$m$^2$.

19. The method of claim 13, wherein, during the step of dimensioning the blade, the outer flowpath radius Re and the inner flowpath radius Ri are further chosen such that $$\frac{Ri}{Re} > c \times N2S + d,$$

wherein:
c=−0.0057;
d=0.7561; and
N2S is in $10^6$ rpm$^2 \cdot$m$^2$.

20. The method of claim 19, wherein, during the step of dimensioning the blade, the outer flowpath radius Re and the inner flowpath radius Ri are further chosen such that $$\frac{Ri}{Re} > e \times N2S + f,$$

wherein:
e=−0.0057;
f=0.8561; and
N2S is in $10^6$ rpm$^2$.m$^2$.

21. The method of claim 13, wherein:
$Cx_{tip}$ is a blade tip chord length defined as an axial distance between the first corner point and the second corner point;
$Cx_{root}$ is a blade root chord length defined as an axial distance between the third corner point and the fourth corner point;
the method comprising a further step of dimensioning the blade during which the blade tip chord length $Cx_{tip}$, the blade root chord length $Cx_{root}$, the outer flowpath radius Re and the inner flowpath radius Ri are chosen such that:
if N2S<15, then $$0.2 < \frac{Cx_{tip}}{Cx_{root}} < c \times N2S + d,$$

wherein:
c=−0.0267; and
d=1.15;
N2S is in $10^6$ rpm$^2 \cdot$m$^2$; and
if N2S≥15, then $$\frac{Cx_{tip}}{Cx_{root}} \in [0.2; 0.75],$$

N2S being in $10^6$ rpm$^2 \cdot$m$^2$; and
wherein the blade tip chord length $Cx_{tip}$ is comprised in a range from 0.005 meters to 0.05 meters and the blade root chord length $Cx_{root}$ is comprised in a range from 0.01 meters to 0.05 meters.

22. The method of claim 21, wherein, during the further step of dimensioning the blade, the blade tip chord length $Cx_{tip}$, the blade root chord length $Cx_{root}$, the outer flowpath radius Re and the inner flowpath radius Ri are chosen such that
if N2S<15, then $$0.2 < \frac{Cx_{tip}}{Cx_{root}} < e \times N2S + f,$$

wherein:
e=−0.0267;
f=1; and
N2S is in $10^6$ rpm$^2 \cdot$m$^2$; and
if N2S≥15, then $$\frac{Cx_{tip}}{Cx_{root}} \in [0.2; 0.6],$$

N2S being in $10^6$ rpm$^2 \cdot$m$^2$.

* * * * *